US00RE46012E

(19) United States
(12) Reissued Patent
Weston et al.

(10) Patent Number: US RE46,012 E
(45) Date of Reissued Patent: May 24, 2016

(54) NON-CONTACT PROBE

(71) Applicant: RENISHAW PLC, Gloucestershire (GB)

(72) Inventors: Nicholas John Weston, Peebles (GB); Yvonne Ruth Huddart, Dunbar (GB)

(73) Assignee: RENISHAW PLC, Wotton-Under-Edge (GB)

(21) Appl. No.: 14/562,093

(22) Filed: Dec. 5, 2014

Related U.S. Patent Documents

Reissue of:
(64) Patent No.: 8,605,983
Issued: Dec. 10, 2013
Appl. No.: 12/733,021
PCT Filed: Aug. 15, 2008
PCT No.: PCT/GB2008/002760
§ 371 (c)(1),
(2) Date: Feb. 3, 2010
PCT Pub. No.: WO2009/024758
PCT Pub. Date: Feb. 26, 2009

(30) Foreign Application Priority Data

Aug. 17, 2007 (GB) ..... 0716080.7
Aug. 17, 2007 (GB) ..... 0716088.0
Aug. 17, 2007 (GB) ..... 0716109.4

(51) Int. Cl.
*G06K 9/00* (2006.01)
*G06K 9/36* (2006.01)
(Continued)

(52) U.S. Cl.
CPC ..... *G01B 11/007* (2013.01); *G01B 11/026* (2013.01); *G01B 11/2527* (2013.01); *G06T 7/0004* (2013.01); *G06T 7/0057* (2013.01);
(Continued)

(58) Field of Classification Search
CPC ..... G01B 11/007; G01B 11/2527; G01B 11/026; G01B 11/25; G01B 11/254; G06T 7/0057
USPC ..... 382/141, 153, 154, 285, 286; 348/48; 702/155, 167
See application file for complete search history.

(56) References Cited

U.S. PATENT DOCUMENTS 4,767,212 A 8/1988 Kitahashi et al.
5,135,309 A 8/1992 Kuchel et al.
(Continued)

FOREIGN PATENT DOCUMENTS

CN 1952595 A 4/2007
CN 101105393 A 1/2008
(Continued)

OTHER PUBLICATIONS

Reeves et al., "Dynamic shape measurement system for laser materials processing," Optical Engineering 42 (10), pp. 2923-2929 (2003).
(Continued)

*Primary Examiner* — Adam L Basehoar
(74) *Attorney, Agent, or Firm* — Oliff PLC

(57) ABSTRACT

A non-contact measurement apparatus and method. A probe is provided for mounting on a coordinate positioning apparatus, comprising at least one imaging device for capturing an image of an object to be measured. Also provided is an image analyzer configured to analyze at least one first image of an object obtained by the probe from a first perspective and at least one second image of the object obtained by the probe from a second perspective so as to identify at least one target feature on the object to be measured. The image analyzer is further configured to obtain topographical data regarding a surface of the object via analysis of an image, obtained by the probe, of the object on which an optical pattern is projected.

36 Claims, 13 Drawing Sheets

(51) Int. Cl.

| | |
|---|---|
| ***H04N 13/02*** | (2006.01) |
| ***G01B 11/00*** | (2006.01) |
| ***G01B 11/25*** | (2006.01) |
| ***G06T 7/00*** | (2006.01) |
| ***G01B 11/02*** | (2006.01) |

(52) U.S. Cl.
CPC ..... *G06T 7/0075* (2013.01); *G06T 2207/30164* (2013.01)

(56) References Cited

U.S. PATENT DOCUMENTS

| | | | | |
|---|---|---|---|---|
| 5,175,601 | A | 12/1992 | Fitts | |
| 5,237,404 | A | 8/1993 | Tanaka et al. | |
| 5,251,156 | A | 10/1993 | Heier et al. | |
| 5,262,844 | A | 11/1993 | Millet et al. | |
| 5,289,264 | A | 2/1994 | Steinbichler | |
| 5,319,445 | A | 6/1994 | Fitts | |
| 5,372,502 | A | 12/1994 | Massen et al. | |
| 5,488,477 | A * | 1/1996 | de Groot | 356/514 |
| 5,646,733 | A | 7/1997 | Bieman | |
| 5,953,448 | A | 9/1999 | Liang | |
| 6,028,672 | A | 2/2000 | Geng | |
| 6,055,056 | A | 4/2000 | Kuehmstedt et al. | |
| 6,084,712 | A | 7/2000 | Harding | |
| 6,100,984 | A | 8/2000 | Chen et al. | |
| 6,144,453 | A | 11/2000 | Hallerman et al. | |
| 6,256,099 | B1 | 7/2001 | Kaufman et al. | |
| 6,291,817 | B1 | 9/2001 | Kobayashi et al. | |
| 6,421,629 | B1 | 7/2002 | Ishiyama | |
| 6,438,272 | B1 | 8/2002 | Huang et al. | |
| 6,532,299 | B1 | 3/2003 | Sachdeva et al. | |
| 6,600,511 | B1 | 7/2003 | Kaneko et al. | |
| 6,674,893 | B1 | 1/2004 | Abe et al. | |
| 6,728,423 | B1 | 4/2004 | Rubbert et al. | |
| 6,738,508 | B1 | 5/2004 | Rubbert et al. | |
| 6,744,914 | B1 | 6/2004 | Rubbert et al. | |
| 6,744,932 | B1 | 6/2004 | Rubbert et al. | |
| 6,771,809 | B1 | 8/2004 | Rubbert et al. | |
| 7,001,024 | B2 | 2/2006 | Kitaguchi et al. | |
| 7,068,836 | B1 | 6/2006 | Rubbert et al. | |
| 7,103,211 | B1 | 9/2006 | Medioni et al. | |
| 7,133,551 | B2 | 11/2006 | Chen et al. | |
| 7,136,170 | B2 | 11/2006 | Notni et al. | |
| 7,171,328 | B1 * | 1/2007 | Walker et al. | 702/136 |
| 7,256,899 | B1 | 8/2007 | Faul et al. | |
| 7,310,514 | B2 | 12/2007 | Shinohara | |
| 7,315,643 | B2 | 1/2008 | Sakamoto et al. | |
| 7,394,536 | B2 | 7/2008 | Sonda et al. | |
| 7,430,312 | B2 | 9/2008 | Gu | |
| 7,538,891 | B1 | 5/2009 | Mello et al. | |
| 7,545,516 | B2 | 6/2009 | Jia et al. | |
| 7,684,052 | B2 | 3/2010 | Suwa et al. | |
| 7,898,651 | B2 | 3/2011 | Hu et al. | |
| 7,912,673 | B2 * | 3/2011 | Hebert et al. | 702/153 |
| 7,929,751 | B2 | 4/2011 | Zhang et al. | |
| 8,111,907 | B2 * | 2/2012 | Boyer | G01B 11/2504 382/154 |
| 2002/0057832 | A1 | 5/2002 | Proesmans et al. | |
| 2002/0181764 | A1 | 12/2002 | Otani et al. | |
| 2003/0123707 | A1 | 7/2003 | Park | |
| 2003/0174880 | A1 | 9/2003 | Sakamoto et al. | |
| 2004/0246496 | A1 | 12/2004 | Yoshida | |
| 2005/0018209 | A1 | 1/2005 | Lemelin et al. | |
| 2005/0201611 | A1 * | 9/2005 | Lloyd et al. | 382/152 |
| 2005/0271264 | A1 | 12/2005 | Ito et al. | |
| 2006/0093206 | A1 | 5/2006 | Rubbert et al. | |
| 2006/0103854 | A1 | 5/2006 | Franke et al. | |
| 2006/0210146 | A1 | 9/2006 | Gu | |
| 2006/0268153 | A1 * | 11/2006 | Rice | A61B 5/0059 348/370 |
| 2007/0057946 | A1 | 3/2007 | Albeck et al. | |
| 2007/0183631 | A1 | 8/2007 | Zhang et al. | |
| 2007/0206204 | A1 | 9/2007 | Jia et al. | |
| 2007/0211258 | A1 | 9/2007 | Lee et al. | |
| 2008/0075328 | A1 * | 3/2008 | Sciammarella | 382/108 |
| 2008/0165341 | A1 | 7/2008 | Dillon et al. | |
| 2008/0239288 | A1 | 10/2008 | Lee et al. | |
| 2009/0238449 | A1 | 9/2009 | Zhang et al. | |
| 2009/0268214 | A1 * | 10/2009 | Lucic | G01B 11/25 356/614 |
| 2010/0008588 | A1 | 1/2010 | Feldkhun et al. | |
| 2010/0046005 | A1 | 2/2010 | Kalkowski et al. | |
| 2010/0296104 | A1 | 11/2010 | Abramovich et al. | |
| 2010/0329538 | A1 | 12/2010 | Remillard | |
| 2011/0317879 | A1 * | 12/2011 | Demopoulos | 382/106 |
| 2012/0307260 | A1 | 12/2012 | Keshavmurthy et al. | |

FOREIGN PATENT DOCUMENTS

| | | | |
|---|---|---|---|
| DE | 38 29 925 | A1 | 3/1990 |
| DE | 39 38 714 | A1 | 5/1991 |
| DE | 43 01 538 | A1 | 7/1994 |
| DE | 196 34 254 | A1 | 3/1997 |
| DE | 198 46 145 | A1 | 4/2000 |
| EP | 0 445 618 | A2 | 9/1991 |
| EP | 0 402 440 | B1 | 6/1995 |
| GB | 2 088 095 | A | 6/1982 |
| GB | 2 375 392 | B | 11/2002 |
| GB | 2 434 541 | A1 | 8/2007 |
| JP | A-61-114109 | | 5/1986 |
| JP | H04-204314 | A | 7/1992 |
| JP | A-06-138055 | | 5/1994 |
| JP | A-07-260451 | | 10/1995 |
| JP | A-11-211442 | | 8/1999 |
| JP | A-11-211443 | | 8/1999 |
| JP | A-2000-097672 | | 4/2000 |
| JP | A-2001-012925 | | 1/2001 |
| JP | A-2001-108422 | | 4/2001 |
| JP | A-2002-54912 | | 2/2002 |
| JP | A-2002-090126 | | 3/2002 |
| JP | A-2002-162215 | | 6/2002 |
| JP | A-2003-269928 | | 9/2003 |
| JP | A-2003-527582 | | 9/2003 |
| JP | A-2004-317495 | | 11/2004 |
| JP | A-2005-345383 | | 12/2005 |
| JP | A-2006-179031 | | 7/2006 |
| JP | A-2007-024764 | | 2/2007 |
| JP | A-2007-093412 | | 4/2007 |
| JP | A-2007-121294 | | 5/2007 |
| JP | A-2007-315882 | | 12/2007 |
| JP | A-2008-076107 | | 4/2008 |
| WO | WO 91/15732 | | 10/1991 |
| WO | WO 97/05449 | A1 | 2/1997 |
| WO | WO 97/36144 | | 10/1997 |
| WO | WO 00/21034 | A1 | 4/2000 |
| WO | WO 01/51887 | A1 | 7/2001 |
| WO | WO 2007/121953 | A1 | 11/2001 |
| WO | WO 2004/083778 | A1 | 9/2004 |
| WO | WO 2004/096502 | A1 | 11/2004 |
| WO | WO 2005/059470 | A1 | 6/2005 |
| WO | WO 2005/073669 | A1 | 8/2005 |
| WO | WO 2007/121953 | A1 | 11/2007 |
| WO | WO 2007/125081 | A1 | 11/2007 |
| WO | WO 2008/046663 | A2 | 4/2008 |
| WO | WO 2009/024756 | A1 | 2/2009 |
| WO | WO 2009/024757 | A1 | 2/2009 |
| WO | WO 2009/024758 | A1 | 2/2009 |
| WO | WO 2009/094510 | A1 | 7/2009 |
| WO | WO 2009/097066 | A1 | 8/2009 |

OTHER PUBLICATIONS

Brauer-Burchardt et al., "Phase unwrapping in fringe projection systems using epipolar geometry," LNCS 5259, pp. 422-432 (2008).

Isliiyama et al., "Absolute phase measurements using geometric constraints between multiple cameras and projectors," Applied Optics 46 (17), pp. 3528-3538 (2007).

Patil et al., "Guest editorial. Moving ahead with phase," Optics and Lasers in Engineering 45, pp. 253-257 (2007).

Kowarschik et al., "Adaptive optical three-dimensional measurement with structured light," Optical Engineering 39 (1), pp, 150-158 (2000).

(56) References Cited

OTHER PUBLICATIONS

Heikkilä et al., "A Four-step Camera Calibration Procedure with Implicit Image Correction," 1997, Proceedings of the 1997 Conference in Computer Vision and Pattern Recognition.
Creath, "Comparison of Phase-Measurement Algorithms," *Surface Characterization and Testing*, 1986, pp. 19-28, SPIE, vol. 680.
Carré, "Installation et utilisation du comparateur photoélectrique et interférential du Bureau International des Poids et Mesures," 1966, *Metrologia*, pp. 13-23, vol. 2, No. 1, France (with abstract).
Stoilov et al.., "Phase-stepping Interferometry: Five-frame Algorithm with an Arbitrary Step," *Optics and Lasers in Engineering*, 1997, pp. 61-69, vol. 28.
Gruen, "Least squares matching: a fundamental measurement algorithm," *Close Range Photogrammetry and Machine Vision*, 2001, pp. 217-255, Whittles Publishing.
Cooper et al., "Theory of close range photogrammetry," *Close Range Photogrammetry and Machine Vision*, 2001, pp. 9-51, Whittles Publishing.
Korner et al., Absolute macroscopic 3-D measurements with the innovative depth-scanning fringe projection technique (DSFP), *Optik International Journal for Light and Electron Optics*, 2001, pp. 433-441, vol. 112, No. 9.
Reich et al., "3-D shape measurement of complex objects by combining photogrammetry and fringe projection," *Optical Engineering*, 2000, pp. 224-231, vol. 39, No. 1, Society of Photo-Optical Instrumentation Engineers.
Ishiyama et al., "Precise 3-D Measurement Using Uncalibrated Pattern Projection," *IEEE International Conference on Image Processing*, 2007, pp. 225-228.
Kühmstedt et al., "3D shape measurement with phase correlation based fringe projection," *Optical Measurement Systems for Industrial Inspection V*, 2007, pp. 1-9, vol. 6616, Proc. of SPIE.
Wong et al., "Fast acquisition of dense depth data by a new structured light scheme," *Computer Vision and Image Understanding*, Dec. 2004, pp. 398-422, vol. 98, Elsevier.
"3D Coordinate Measurement —Milling on digitized data; Casted Blanks," www.gom.com, obtained Aug. 7, 2007, GOM mbH.
"Measuring Systems—TRITOP," http://www.gom.com/EN/measuring.systems/tritop/system/system.html, obtained Aug. 7, 2007, GOM mbH.
Coggrave, "Wholefield Optical Metrology: Surface Profile Measurement," 2002-2004, pp. 1-35, Phase Vision Ltd.
Sansont et al., "Three-dimensional vision based on a combination of gray-code and phase-shift light projection: analysis and compensation of the systematic errors," *Applied Optics*, 1999, pp. 6565-6573, vol. 38, No. 31, Optical Society of America.
Leymarie, "Theory of Close Range Photogrammetry," http://www.lems.brown.edu/vision/people/leymarie/Refs/Photogrammetry/Atkinson90/Ch2Theory.html, May 10, 2010 update, Ch. 2 of [Atkinson 90], obtained Mar. 31, 2010.
"Measuring Systems—ATOS," http://www.gom.com/EN/measuring.systems/atos/system/system.html, obtained Oct. 6, 2008, GOM mbH.
"3D-Digitizing of a Ford Focus—Interior/Exterior—Product Analysis," www.gom.com, obtained Oct. 6, 2008, GOM mbH.
"optoTOP-HE—The HighEnd 3D Digitising System," http://www.breuckmann.com/index.php?id=optotop-he&L=2, obtained Oct. 6, 2008, Breuckmann.
Nov. 18, 2008 International Search Report issued in International Patent Application No. PCT/GB2008/002759.
Aug. 16, 2013 Office Action issued in Japanese Patent Application No. 2010-521465 (with translation).
Aug. 9, 2013 Office Action issued in Japanese Patent Application No. 2010-521466 (with translation).
Aug. 9, 2013 Office Action issued in Japanese Patent Application No. 2010-521467 (with translation).
Jul. 25, 2013 Office Action issued in U.S. Appl. No. 12/733,022.
Wolfson, et al. "Three-Dimensional Vision Technology Offers Real-Time Inspection Capability," Sensor Review, 1997, pp. 299-303, vol., 17, No. 4, MCB University Press.
Nov. 16, 2012 Office Action issued in Japanese Patent Application No. 2010-521467 (with translation).
Feb. 16, 2013 Office Action issued in Chinese Application No. 200880112194.7 (with translation).
Feb. 16, 2013 Office Action issued in Chinese Application No. 200880111247.3 (with translation).
Nov. 16, 2012 Japanese Office Action issued in Application No. 2010-521466 (with translation).
Feb. 6, 2013 Office Action issued in U.S. Appl. No. 12/733,025.
Sep. 21, 2012 Office Action issued in Japanese Patent Application No. 2010-521465 (with translation).
Tsai, R. et al., "A New Technique for Fully Autonomous and Efficient 3D Robotics Hand/Eye Calibration," *IEEE Transactions on Robotics and Automation*, Jun. 1989, pp. 345-358, vol. 5, No. 3.
Mar. 9, 2011 Chinese Office Action issued in Chinese Application No. 200880111248.8 (translation only).
Jun. 15, 2011 Office Action issued in Chinese Patent Application No. 200880111247.3 (translation only).
Takeda et al, "Fourier-transform method of fringe-pattern analysis for computer-based topography and interferometry", Optical Society of America, Jan. 1982, vol. 72, No. 1, pp, 156-160.
Geometrical Product Specifications (GPS)—Geometrical Features, British Standard, BS EN ISO 1466-1:2000.
Jan. 30, 2012 Office Action issued in European Application No. 08 788 327.8.
Jan. 6, 2012 Second Office Action issued in Chinese Patent Application No. 200880111248.8 (translation only).
Jun. 15, 2011 Office Action issued in Chinese Patent Application No. 200880112194.7.
May 3, 2012 Chinese Office Action issued in Chinese Patent Application No. 200880112194.7 (with translation).
Kemper et al., "Quantitative determination of out-of-plane displacements by endoscopic electronic-speckle-pattern interferometry", Optics Communication 194, pp. 75-82, Jul. 1, 2001.
Cuypers, W. et al., "Optical measurement techniques for mobile and large-scale dimensional metrology", Optics and Lasers in Engineering, 47, 2009, pp. 292-300.
"Picture Perfect Measurements, Do I need to use special targets with the system?", 1 page, Geodetic Systems Inc., downloaded Sep. 6, 2012 from http://www.geodetic.com/do-i-need-to-use-special-targets-with-system.aspx.
"Application Notes-TRITOP", 1 page, GOM Optical Measuring Techniques, downloaded Sep. 6, 2012 from http://www.gom.com/industries/application-notes-tritop.html.
"Picture Perfect Measurements, The Basics of Photogrammetry", 14 pages, Geodetic Systems Inc., downloaded Sep. 6, 2012 from http://www.geodetic.com/v-stars/what-is-photogrammetry.aspx.
"Application Example: 3D-Coordinate Measurement Mobile 3D Coordinate Measurement for Shipbuilding", 6 pages, GOM Optical Measuring Techniques, downloaded Sep. 6, 2012 from http://www.gom.com/fileadmin/user_upload/industries/shipbuilding_EN.pdf.
Wallace et al., "High-speed photogrammetry system for measuring the kinematics of insect wings," *Applied Optics*, vol. 45, No. 17, Jun. 10, 2006, pp. 4165-4173.
Dec. 2, 2013 Chinese Office Action issued in Chinese Patent Application No. 201080040329.0 (with translation).
Mar. 12, 2013 Office Action issued in U.S. Appl. No. 12/733,022.
Aug. 12, 2014 Office Action issued in Japanese Patent Application No. 2012-5288441 (with translation).
Oct. 20, 2014 Notice of Allowance issued in U.S. Appl. No. 12/733,025.
May 28, 2014 Notice of Allowance issued in U.S. Appl. No. 12/733,025.
Jan. 28, 2014 Office Action issued in Japanese Patent Application No. 2012-528441 (with translation).
Feb. 27, 2011 Office Action issued in European Patent Application No. 08 788 328.6.
Feb. 28, 2014 Notice of Allowance issued in U.S. Appl. No. 12/733,025.
Jan. 31, 2014 Notice of Allowance issued in U.S. Appl. No. 12/733,022.
Feb. 25, 2014 Office Action issued in Japanese Patent Application No. 2010-521467 (with translation).

(56) References Cited

OTHER PUBLICATIONS

Pawlowski et al., "Shape and Position Determination Based on Combination of Photogrammetry with Phase Analysis of Fringe Patterns", CAIP 2001, LNCS 2124, pp. 391-399.
Jul. 24, 2014 Office Action issued in European Application No. 08 788 329.4.
Jul. 22, 2014 Office Action issued in Japanese Patent Application No. 2010-521465 (with translation).
Human translation of DE 196 34 254 A1.
Jan. 29, 2015 Office Action issued in U.S. Appl. No. 13/392,710.
Mar. 3, 2015 Notice for Revocation of Reconsideration issued in Japanese Application No. 2010-521465.
Jul. 6, 2015 Office Action issued in European Application No. 10 761 058.6.
Aug. 5, 2015 Office Action issued in U.S. Appl. No. 13/392,710.
Tsai, R. et al., "A New Technique for Fully Autonomous and Efficient 3D Robotics Hand/Eye Calibration," *IEEE Transactions on Robotics and Automation*, Jun. 1989, pp. 345-358, col. 5, No. 3.
Hailong, J. et al., "Shape reconstruction methods from gradient field," *Laser Journal*, 2007, pp. 41-43, vol. 28, No. 6 (with Abstract).
Chinese Office Action issued in Chinese Application No. 200880111248.8 on Mar. 9, 2011 (translation only).
English translation of Jun. 15, 2011 Office Action issued in Chinese Patent Application No. 200880111247.3.
Marapane, "Region-Based Stereo Analysis for Robotic Applications", IEEE, 1989, pp. 307-324.
Takasaki, "MOIRE Topography", Applied Optics, Jun. 1970, vol. 9, No. 6, pp. 1467-1472.
Jan. 30, 2012 Office Action issued in European Application No. 08 788 329.4.
Sep. 29, 2009 Search Report issued in Great Britain Application No. GB0915904.7.
Dec. 21, 2010 International Search Report issued in International Application No. PCT/GB2010/0001675.
Dec. 21, 2010 Written Opinion of the International Searching Authority issued in International Application No. PCT/GB2010/0001675.
U.S. Appl. No. 13/392,710, filed Feb. 27, 2012 in the name of Weston et al.
Apr. 26, 2012 Office Action issued in European Patent Application No. 08 788 328.6.
May 3, 2012 Office Action issued in Chinese Patent Application No. 200880111247.3 (with translation).
Apr. 23, 2012 Chinese Office Action issued in Chinese Patent Application No. 200880111248.8 (with translation).
Huntley et al., "Shape measurement by temporal phase unwrapping: comparison of unwrapping algorithms," Measurement Science and Technology 8, pp. 986-992 (1997).
Sasso et al., "Superimposed fringe projection for three-dimensional shape acquisition by image analysis," Applied Optics 48 (13), pp. 2410-2420 (2009).
Takeda et al., "Fourier transform profilometry for the automatic measurement of 3-D object shapes," Applied Optics 22 (24), pp. 3977-3982 (1983).
Fryer, "Camera Calibration," *Close Range Photogrammetry and Machine Vision*, 1996, pp. 156-179, Whittles Publishing.
Parker, "Advanced-Edge Detection Techniques: The Canny and the shen-Castan Methods," 1997, pp. 1-33, John Wiley & Sons, Inc.
Scharstein et al., "High-Accuracy Stereo Depth Maps Using Structured Light," Proc. 2003 IEEE Computer Society Conference on Computer Vision and Pattern Recognition, 2003, pp. 195-202, vol. 1, Computer Society.
Schreiber et al., "Managing some calibration problems in fringe projection shape measurement systems," *Measurement systems for Optical Methodology*, 1997, pp. 443-450, Fringe.
Schreiber et al., "Theory and arrangements of self-calibrating whole-body three-dimensional measurement systems using fringe projection technique," *Optical Engineering*, 2000, pp. 159-169, vol. 39, No. 1, Society of Photo-Optical Instrumentation Engineers.
Chen et al., "Range data acquisition using color structured lighting and stereo vision," *Image and Vision Computing*, 1997, pp. 445-456, vol. 15, Elsevier.
Kim et al., "An active trinocular vision system of sensing indoor navigation environment for mobile robots," *Sensors and Actuators A*, Sep. 2005, pp. 192-209, vol. 125, Elsevier.
"Measuring systems—TRITOP," http://www.gom.com/EN/measuring.systems/tritop/system.html, obtained Aug. 7, 2007, GOM mbH.
Clarke, "Non-contact measurement provides six of the best," *Quality Today*, 1998, pp. s46, s48.
Chen et al., "Overview of three-dimensional shape measurement using optical methods," *Opt. Eng.*, 2000, pp. 10-22, Society of Photo-Optical Instrumentation Engineers.
Galanulis et al., "Optical Digitizing by ATOS for Press Parts and Tools," www.gom.com, Feb. 2004, GOM mbH.
Nov. 18, 2008 Written Opinion issued in International Patent Application No. PCT/GB2008/002759.
Nov. 18, 2008 International Search Report issued in International Patent Application No. PCT/GB2008/002760.
Nov. 18, 2008 Written Opinion issued In International Patent Application No. PCT/GB2008/002760.
Nov. 18, 2008 International Search Report issued in International Patent Application No. PCT/GB2008/002758.
Nov. 18, 2008 Written Opinion issued in International Patent Application No. PCT/GB2008/002758.
U.S. Appl. No. 12/733,022, filed Feb. 3, 2010 in the name of Weston et al.
U.S. Appl. No. 12/733,025, filed Feb. 3, 2010 in the name of Weston et al.
Aug. 21, 2012 Office Action issued in U.S. Appl. No. 12/733,025.
Aug. 23, 2012 Office Action issued in U.S. Appl. No. 12/733,022.
Sep. 11, 2013 Office action issued in U.S. Appl. No. 12/733,025.
English-language translation of JP-A-2007-93412 published Apr. 12, 2007.
English-language translation of JP-A-11-211442 published Aug. 6, 1999.

* cited by examiner

NON-CONTACT PROBE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This invention relates to a method and apparatus for measuring an object without contacting the object.

Photogrammetry is a known technique for determining the location of certain points on an object from photographs taken at different perspectives, i.e. positions and/or orientations. Typically photogrammetry comprises obtaining at least two images of an object taken from two different perspectives. For each image the two dimensional coordinates of a feature of the object on the image can determined. It is then possible from the knowledge of the relative location and orientation of the camera(s) which took the images, and the points at which the feature is formed on the images to determine the three dimensional coordinates of the feature on the object via triangulation. Such a technique is disclosed for example in U.S. Pat. No. 5,251,156 the entire content of which is incorporated into this specification by this reference.

Non-contact optical measuring systems are also known for measuring the topography of a surface. These may typically consist of a projector which projects a structured light pattern onto a surface and a camera, set at an angle to the projector, which detects the structured light pattern on the surface. Height variation on the surface causes a distortion in the pattern. From this distortion the geometry of the surface can be calculated via triangulation and/or phase analysis techniques.

Current known systems enable either photogrammetry or phase analysis to be performed in order to obtain measurement data regarding the object.

The invention provides a method and apparatus in which measurement of an object via photogrammetric techniques and triangulation and/or phase analysis techniques can be performed on images obtained by a common probe.

According to a first aspect of the invention there is provided, a non-contact measurement apparatus, comprising: a probe for mounting on a coordinate positioning apparatus, comprising at least one imaging device for capturing an image of an object to be measured; an image analyser configured to analyse at least one first image of an object obtained by the probe from a first perspective and at least one second image of the object obtained by the probe from a second perspective so as to identify at least one target feature on the object to be measured, and further configured to obtain topographical data regarding a surface of the object via analysis of an image, obtained by the probe, of the object on which an optical pattern is projected.

It is an advantage of the present invention that both the position of target features on the object, and the topographical data of the surface of the object are determined by the image analyser using images obtained by the same probe. Accordingly, it is not necessary to have two separate imaging systems for obtaining both the position of target features of an object and the topographical form of the surface of the object.

As will be understood, a perspective can be a particular view point of the object. A perspective can be defined by the position and/or orientation of the imaging device relative to the object.

The at least one first image and the at least one second image can be obtained by at least one suitable imaging device. Suitable imaging devices can comprise at least one image sensor. For example, suitable imaging devices can comprise an optical electromagnetic radiation (EMR) sensitive detector, such as a charge-coupled device (CCD), a complementary metal-oxide-semiconductor (CMOS). Suitable imaging devices can be optically configured to focus light at the image plane. As will be understood, the image plane can be defined by the image sensor. For example, suitable imaging devices can comprise at least one optical component configured to focus optical EMR at the image plane. Optionally, the at least one optical component comprises a lens.

Suitable imaging devices can be based on the pinhole camera model which consists of a pinhole, which can also be referred to as the imaging device's perspective centre, through which optical EMR rays are assumed to pass before intersecting with the image plane. As will be understood, imaging devices that do not comprise a pinhole but instead comprise a lens to focus optical EMR also have a perspective centre and this can be the point through which all optical EMR rays that intersect with the image plane are assumed to pass.

As will be understood, the perspective centre can be found relative to the image sensor using a calibration procedure, such as those described in J. Heikkila and O. Silven, "A four-step camera calibration procedure with implicit image correction", Proceedings of the 1997 Conference in Computer Vision and Pattern Recognition (CVPR '97) and J. G Fryer, "Camera Calibration" in K. B. Atkinson (ed.) "Close range photogrammetry and machine vision", Whittles publishing (1996). Correction parameters such as those for correcting lens aberrations can be provided and are well known and are for instance described in these two documents.

The probe can comprise a plurality of imaging devices. Preferably, the images analysed by the image analyser are obtained using a common imaging device. Accordingly, in this case the probe can comprise a single imaging device only.

Preferably the optical pattern is projected over an area of the object. Preferably the pattern extends over an area of the object so as to facilitate the measurement of a plurality of points of the object over the area image. Preferably the pattern is a substantially repetitive pattern. Particularly preferred optical patterns comprise substantially periodic optical patterns. As will be understood, a periodic optical pattern can be a pattern which repeats after a certain finite distance. The minimum distance between repetitions can be the period of the pattern. Preferably the optical pattern is periodic in at least one dimension. Optionally, the optical pattern can be periodic in at least two perpendicular dimensions.

Suitable optical patterns for use with the present invention include patterns of concentric circles, patterns of lines of varying colour, shades, and/or tones. The colour, shades and/or tones could alternate between two or more different values. Optionally, the colour, shade and/or tones could vary between a plurality of discrete values. Preferably, the colour, shade and/or tones varies continuously across the optical pattern. Preferably, the optical pattern is a fringe pattern. For example, the optical pattern can be a set of sinusoidal fringes. The optical pattern can be in the infrared to ultraviolet range. Preferably, the optical pattern is a visible optical pattern. As will be understood, an optical pattern for use in methods such as that of the present invention is also commonly referred to as a structured light pattern.

The optical pattern could be projected onto the object via at least one projector. Suitable projectors for the optical pattern include a digital light projector configured to project an image input from a processor device. Such a projector enables the pattern projected to be changed. Suitable projectors could comprise a light source and one or more diffraction gratings arranged to produce the optical pattern. The diffraction grating(s) could be moveable so as to enable the pattern projected by the projector to be changed. For instance, the diffraction grating(s) can be mounted on a piezoelectric transducer. Optionally, the diffraction gratings could be fixed such that the pattern projected by the projector cannot be changed. Optionally the projector could comprise a light source and a hologram. Further, the projector could comprise a light source and a patterned slide. Further still, the projector could comprise two mutually coherent light sources. The coherent light sources could be moveable so as to enable the pattern projected by the projector to be changed. For instance, the coherent light sources can be mounted on a piezoelectric transducer. Optionally, the coherent light sources could be fixed such that the pattern projected by the projector cannot be changed.

The at least one projector could be provided separately to the probe. Preferably, the probe comprises the at least one projector. Preferably the probe comprises a single projector only.

A target feature can be a predetermined mark on the object. The predetermined mark could be a part of the object, for example a predetermined pattern formed on the object's surface. Optionally, the mark could be attached to the object for the purpose of identifying a target feature. For example, the mark could be a coded "bull's eye", wherein the "bull's-eye" has a unique central point which is invariant with perspective, surrounded by a set of concentric black and white rings which code a unique identifier. Automatic feature recognition methods can be used to both locate the centre of the target and also decode the unique identifier. By means of such targets the images can be automatically analysed and the coordinates of the "bull's-eye" centre returned.

As will be understood, the image analyser could be configured to analyser further images of the object being obtained from further known perspectives that are different to the perspectives of the other images. The more images that are analysed the more accurate and reliable the position determination of the target feature on the object can be.

A target feature on the object to be measured can be identified by feature recognition techniques. For example, a Hough Transform can be used to identify a straight line feature on the object.

At least one of the at least one first image and at least second image can be an image of the object onto which an optical pattern is projected. The optical pattern need not be the same as the imaged optical pattern used for obtaining topographical data. Preferably, the at least one first image and at least second image are images of the object onto which an optical pattern is projected. This enables topographical data to be obtained from at least one of the at least one first and at least one second image.

Preferably, the image analyser is configured to identify an irregularity in the optical pattern in each of the first and second images as the at least one target feature. This is advantageous as target features can be identified without the use of markers placed on the object. This has been found to enable highly accurate measurements of the object to be taken quickly. It has also been found that the method of the invention can require less processing resources to identify points on complex shaped objects than by other known image processing techniques.

As will be understood, an irregularity in the optical pattern can also be referred to as discontinuity in the optical pattern.

An irregularity in the optical pattern can be a deformation of the optical pattern caused by a discontinuous feature on the object. Such a deformation of the optical pattern can, for example, be caused at the boundary between two continuous sections of an object. For instance, the boundary could be the edge of a cube at which two faces of the cube meet. Accordingly, a discontinuous feature on the object can be where the gradient of the surface of the object changes significantly. The greater the gradient of the surface relative to the optical pattern projector, the greater the deformation of the optical pattern at that point on the surface. Accordingly, an irregularity could be identified by identifying those points on the object at which the optical pattern is deformed by more than a predetermined threshold. This predetermined threshold will depend on a number of factors, including the size and shape of the object to be measured. Optionally, the predetermined threshold can be determined and set prior to operation by a user based on the knowledge of the object to be measured.

An irregularity can be can be identified by identifying in an image those points on the object at which the rate of change of the optical pattern is greater than a predetermined threshold rate of change. For instance, in embodiments in which the optical pattern is a periodic optical pattern, an irregularity can be identified by identifying in an image those points on the object at which the rate of change of the phase of the periodic optical pattern is greater than a predetermined threshold rate of change. In particular, in embodiments in which the optical pattern is a fringe pattern, an irregularity can be identified by identifying in an image those points on the object at which the rate of change of the phase of the fringe pattern is greater than a predetermined threshold rate of change.

The rate of change of the phase of an optical pattern as imaged when projected onto an object can be identified by creating a phase map from the image, and then looking for jumps in the phase between adjacent points in the phase map above a predetermined threshold. As will be understood, a phase map is a map which contains the phase a pattern projected onto the object's surface for a plurality of pixels in an image. The phase map could be a wrapped phase map. The phase map could be an unwrapped phase map. Known techniques can be used to unwrap a wrapped phase map in order to obtain an unwrapped phase map.

A phase map can be created from a single image of the optical pattern object. For example, Fourier Transform techniques could be used to create the phase map.

Preferably a phase map is created from a set of images of the object from substantially the same perspective, in which the position of the optical pattern on the object is different for each image. Accordingly, a phase map can be created using a phase stepping approach. This can provide a more accurate phase map. Phase stepping algorithms known and are for example described in Creath, K. "Comparison of phase measurement algorithms" Proc. SPIE 680, 19-28 (1986). Accordingly, the method can comprise obtaining a set of first images of the optical pattern on the object from the first perspective. The method can further comprise obtaining a set of second images of the optical pattern on the object from the second perspective. A set of images can comprise a plurality of images of the object from a given perspective. Preferably, a set of images comprises at least two images, more preferably at least three images, especially preferably at least four images. The position (e.g. phase) of the optical pattern on the object can be different for each image in a set.

The image analyser can be configured to process: a set of first images obtained from the first known perspective, the position of the optical pattern on the object being different for each image in the set; and a set of second images obtained from the second known perspective, the position of the optical pattern on the object being different for each image in the set in order to identify at least one target feature on the object to be measured and to determine the position of the target feature on the object relative to the image sensor.

Further details of a method of identifying an irregularity in the optical pattern in each of the at least one first and second images as a target feature are disclosed in the co-pending PCT application filed on the same day as the present application with the title NON-CONTACT MEASUREMENT APPARATUS AND METHOD and having the applicant's reference number 741/WO/0 and claiming priority from UK Patent Application nos. 0716080.7, 0716088.0, 0716109.4. Subject matter that is disclosed in that application is incorporated in the specification of the present application by this reference.

As will be understood, topographical data can be data indicating the topography of at least a part of the object's surface. The topographical data can be data indicating the height of the object's surface at least one point on the object, and preferably at a plurality of points across the object. The topographical data can be data indicating the gradient of the object's surface, at least one point on the object, and preferably at a plurality of points across the object. The topographical data can be data indicating the height and/or gradient of the object's surface relative to the image sensor.

The topographical data can be obtained via analysing the optical pattern. For instance, the topographical data can be obtained via analysing the deformation of the optical pattern. This can be done for example via triangulation techniques. Optionally, the topographical data can be obtained via analysing the optical pattern using phase analysis techniques.

The at least one image processed by the imager analyser to obtain topographical data can be a separate image from the at least one first and at least one second images. Optionally, the topographical data regarding the surface on which the optical pattern is projected can be obtained from at least one of the at least one first and at least one second images. Accordingly, at least one of the at least one first and at least one second images can be an image of the object on which a optical pattern is projected.

The image analyser could be configured to generate a phase map from at least one of the plurality of images. The image analyser could be configured to generate a phase map from at least one of the at least one first image and at least one second image. The phase map could be generated by Fourier Transforming one of the plurality of images.

The image analyser can be configured to process a set of images in which the position of an optical pattern on the object is different for each image in the set in order to determine the topographical data. Optionally, as described above, a phase map can be created from a set of images of the object from the same perspective, in which the position (e.g. phase) of the optical pattern at the object is different for each image.

In particular, the image analyser can be configured to process at least one of the first or second sets of images in order to determine the topographical data. Accordingly, the image analyser can be configured to process at least one of: a set of first images obtained from the first perspective, the position of the optical pattern on the object being different for each image in the set; and a set of second images obtained from the second perspective, the position of the optical pattern on the object being different for each image in the set, in order to determine the height variation data. Accordingly, the image analyser can be configured to calculate a phase map from at least one of the set of first images and the set of second images.

A wrapped phase map can be used to obtain topographical data. For instance, a wrapped phase map can be unwrapped, and the topographical data can be obtained from the unwrapped phase map. Accordingly, the image analyser can be configured to unwrap the wrapped phase map and to obtain the topographical data from the unwrapped phase map. The topographical data could be in the form of height data. As will be understood, height data can detail the position of a plurality of points on the surface.

Obtaining topographical data can comprise determining the gradient of the surface. Obtaining topographical data can comprise determining the gradient of the surface relative to the imaging device.

Determining the gradient of the surface relative to the imaging device can comprise calculating a phase shift map from the plurality of images. Suitable algorithms for generating a phase shift map from the plurality of images include a Carré algorithm such as that described in Cure, P. "Installation et utilisation du comparateur photoelectrique et interferential du Bureau International des Podis et Mesure" Metrologia 2 13-23 (1996). Determining the gradient of the surface can further obtaining a gradient map based on the phase shift map. The gradient map can be obtained by converting the value of each of the points on a phase shift map to a gradient value. The value of a point in a phase shift map can be converted to a gradient value using a predetermined mapping procedure. As will be understood, a phase shift map can detail the phase shift for a plurality of points on the surface due to the change in position of projected fringes on the object's surface. The phase shift can be bound in a range of 360 degrees. A gradient map can detail the surface gradient relative to the image sensor of a plurality of points on the surface.

The method can further comprise integrating the gradient map to obtain height data. As explained above, height data can detail the position of a plurality of points on the surface relative to the image sensor.

The image analyser can be configured to calculate at least one of a first phase map from the set of first images and a second phase map from the set of second images. Phase maps calculated from a set of images taken from the substantially the same perspective, the position of the optical pattern on the object in each image being different, can provide a more accurate and reliable phase map.

The image analyser can be configured to determine the topographical data from at least one of the at least one of a first phase map and second phase map. As mentioned above, the phase maps can be wrapped phase maps. In this case, the at least one of a first wrapped phase map and second wrapped phase map can be unwrapped, and the topographical data can be obtained from the unwrapped phase map.

The position of the optical pattern could be changed between obtaining each of the images in a set of images by changing the optical pattern emitted by the projector. For instance, a projector can comprise a laser beam which is incident on a lens which diverges the beam on to a liquid crystal system to generate at least one fringe pattern on the surface to be measured. A computer can be used to control the pitch and phase of the fringe pattern generated by the liquid crystal system. The computer and the liquid crystal system can perform a phase-shifting technique in order to change the phase of the optical pattern.

Optionally, the position of the optical pattern could be changed by relatively moving the object and the projector. The object and projector could be rotated relative to each other in order to displace the optical pattern on the surface. Optionally, the object and projector are laterally displaced relative to each other. As will be understood, the object could be moved between the obtaining each of the plurality of images. Optionally, the projector could be moved between the obtaining each of the plurality of images.

This can be particularly preferred when the projector has a fixed optical pattern. Accordingly, the projector can be configured such that it can project one optical pattern only. For example, the projector could be one in which the pitch or phase of the optical pattern cannot be altered.

The object and projector can be moved relative to each other by any amount which provides a change in the position of the projected optical pattern relative to the object. When the optical pattern has a period, preferably the object and projector are moved relative to each other such that the position of the pattern on the object is at least nominally moved by a non-integral multiple of the period of the pattern. For instance, when the optical pattern is a fringe pattern, the object and projector can be relative to each other such that the position of the pattern on the object is at least nominally moved by a non-integral multiple of the fringe period. For example, the object and projector can be moved relative to each other such that the position of the pattern on the object is at least nominally moved by a ¼ of the fringe period. As will be understood, the actual distance the projector and object are to be moved relative to each other to obtain such a shift in the pattern on the object can depend on a number of factors including the period of the periodic optical pattern projected and the distance between the object and the projector.

As will be understood, relatively moving the projector and object will cause a change in the position of the optical pattern on the object. However, it may appear from images of the optical pattern on the object taken before and after the relative movement that the optical pattern has not moved. This can be referred to as nominal movement. Whether or not the movement is nominal or actual will depend on a number of factors including the form of the optical pattern projected, and the shape and/or orientation of the surface of the object relative to the projector. For instance, the change in position of the optical pattern on a surface for a given movement will be different for differently shaped and oriented surfaces. It might be that due to the shape and/or orientation of the surface that it would appear that the optical pattern has not changed position, when it fact it has moved and that that movement would have been apparent on a differently shaped or positioned object. What is important is that it is known that the relative movement is such that it would cause a change in the position of the optical pattern on a reference surface of a known shape and orientation relative to the projector. Accordingly, it is effectively possible to determine the shape and orientation of the surface by determining how the position of the optical pattern as imaged differs from the known reference.

The projector could be moved such that the position of the optical pattern relative to a predetermined reference plane in the measurement space is changed. The projector could be moved such that the position of the optical pattern relative to a predetermined reference plane in the measurement space is changed by a non-integral multiple of the period of the pattern. The predetermined reference plane could be the reference plane of the image sensor. Again, the shape and/or orientation of the surface of the object can then be determined by effectively comparing the position of the optical pattern on the surface relative to what it would be like at the reference plane.

If the probe comprises the projector, then the object and imaging device will be moved relative to each other as a consequence of obtaining a shift in the position of the optical pattern on the object. In this case, then preferably the amount of relative movement should be sufficiently small such that the perspective of the object obtained by the image sensor in each of the images is substantially the same. In particular, preferably the movement is sufficiently small that any change in the perspective between the plurality of images can be compensated for in the step of analysing the plurality images.

In a preferred embodiment in which the probe comprises a projector and an imaging device, the probe can be moved between images by rotating the probe about the imaging device's perspective centre. It has been found that rotating about the imaging device's perspective centre makes processing the images to compensate for any relative movement between the object and imaging device (discussed in more detail below). In particular it makes matching corresponding pixels across a number of images easier. For instance, matching corresponding pixels is possible using a coordinate transformation which is independent of the distance between the object and the imaging device. Accordingly, it is not necessary to know the distance between the object and imaging device in order to process the images to compensate for any relative movement between the object and imaging device.

Accordingly, the image analyser can be configured to: i) identify common image areas covered by each of the images in a set of images. The image analyser can be configured to then ii) calculate the phase map for the set using the common image areas only. Identifying common image areas covered by each of the images in a set of images can comprise adjusting the image coordinates to compensate for relative movement between the object and the imaging device.

Details of a method and apparatus in which the position of an optical pattern on the object is changed between obtaining each of a plurality of images of the object, and in which topographical data is obtained by analysing those images are disclosed in the co-pending PCT application filed on the same day as the present application with the title PHASE ANALYSIS MEASUREMENT APPARATUS AND METHOD and having the applicant's reference number 742/WO/0 and claiming priority from UK Patent Application nos. 0716080.7, 0716088.0, 0716109.4.

Accordingly, in particular, this application describes a non-contact measurement apparatus, comprising: a probe for mounting on a coordinate positioning apparatus, the probe comprising a projector for projecting an optical pattern onto the surface of an object to be measured, and an image sensor for imaging the optical pattern on the surface of the object; an image analyser configured to analyse at least one first image of an object on which an optical pattern is projected, the first image being obtained from a first known perspective, and at least one second image of the object on which the optical pattern is projected, the second image being obtained from a second known perspective, so as to: a) identify at least one target feature on the object to be measured and to determine the position of the target feature on the object relative to the image sensor; and b) determine topographical data regarding the surface on which the optical pattern is projected from at least one of the first and second images.

This application also describes in particular a non-contact method for measuring an object located within a measurement space comprising, in any suitable order, the steps of: i) an image sensor obtaining at least a first image of an object on which an optical pattern is projected, the at least first image being obtained from a first perspective; ii) the image sensor obtaining at least a second image of the object on which the optical pattern is projected, the second image being obtained from a second perspective; and iii) analysing the first and at least second images so as to: a) identify at least one target feature on the object to be measured and to determine the position of the target feature on the object relative to the image sensor; and b) obtain shape data of the surface on which the optical pattern is projected from at least one of the first and second imaged optical patterns.

According to a second aspect of the invention there is provided an image analyser for use in a non-contact measurement apparatus as described above.

According to a third aspect of the invention there is provided a non-contact method for measuring an object located within a measurement space using a probe comprising at least one imaging device, the method comprising: the probe obtaining a plurality of images of the object, comprising at least one first image of the object from a first perspective, at least one second image of the object from a second perspective, and at least one image of the object on which a optical pattern is projected; analysing the plurality of images to identify at least one target feature on the object to be measured and to obtain topographical data regarding a surface of the object via analysis of the optical pattern.

At least one of the at least one image of the object from a first perspective and at least one image of the object from a second perspective comprises the at least one image of the object on which an optical pattern is projected. Accordingly, the method can comprise obtaining topographical data from at least one of the at least one first image of the object from a first perspective and at least one second image of the object from a second perspective.

The method can comprise relatively moving the object and probe between the first and second perspectives. This can be particularly preferred when the probe comprises a single imaging device only.

The optical pattern can be projected by a projector that is separate to the probe. Optionally, the probe can comprise at least one projector for projecting an optical pattern.

According to a fourth aspect of the invention there is provided a non-contact measurement apparatus, comprising: a coordinate positioning apparatus having a repositionable head; and a non-contact measurement probe mounted on the head comprising: a projector for projecting an optical pattern onto the surface of an object to be measured; and an image sensor for imaging the optical pattern on the surface of the object.

It is an advantage of the invention that the probe is mounted on a coordinate positioning apparatus. Doing so facilitates the acquisition of images of an object from multiple perspectives through the use of only a single probe device. Further as the probe is mounted on a coordinate positioning apparatus, it can be possible to accurately determine the position and orientation of the probe from the coordinate positioning machine's position reporting features. For example, the coordinate position machine could comprise a plurality of encoders for determining the position of relatively moveable parts of the coordinate positioning machine. In this case, the position and orientation of the image sensor could be determined from the output of the encoders. As will be understood, coordinate positioning apparatus include coordinate measuring machines and other positioning apparatus such as articulating arms and machine tools, the position of what a tool or other device mounted on them can be determined.

Preferably the head is an articulating probe head. Accordingly, preferably the probe head can be rotated about at least one axis. Preferably the coordinate positioning apparatus is a computer controlled positioning apparatus. The coordinate positioning apparatus could comprise a coordinate measuring machine (CMM). The coordinate positioning apparatus could comprise a machine tool.

The non-contact measurement apparatus could further comprise an image analyser configured to determine topographical data regarding the surface on which an optical pattern is projected by the projector from at least one of image obtained by the image sensor. The image analyser could be configured as described above.

This application also describes a non-contact measurement probe for mounting on a coordinate positioning apparatus, comprising: a projector for projecting an optical pattern onto the surface of an object to be measured; and an image sensor for imaging the optical pattern on the surface of the object.

This application further describes a non-contact measurement method comprising: a projector mounted on a head of a coordinate positioning machine projecting an optical pattern onto a surface of an object to be measured; an image sensor imaging the optical pattern on the surface; and an image analyser determining topographical data regarding the surface of the object based on the image and on position information from the coordinate positioning machine.

The optical pattern can extend in two dimensions. The optical pattern projected can enable the determination of the topology of the surface of an object in two dimensions from a single image of the optical pattern on the object. The optical pattern can be a substantially full-field optical pattern. A substantially full-field optical pattern can be one in which the pattern extends over at least 50% of the field of view of the image sensor at a reference plane (described in more detail below), more preferably over at least 75%, especially preferably over at least 95%, for example substantially over the entire field of view of the image sensor at a reference plane. The reference plane can be a plane that is a known distance away from the image sensor. Optionally, the reference plane can be a plane which contains the point at which the projector's and image sensor's optical axes intersect. The reference plane can extend perpendicular to the image sensor's optical axis.

The optical pattern could be a set of concentric circles, or a set of parallel lines of alternating colour, shades, or tones. Preferably, the periodic optical pattern is a fringe pattern. For example, the periodic optical pattern can be a set of sinusoidal fringes. The periodic optical pattern can be in the infrared to ultraviolet range. Preferably, the periodic optical pattern is a visible periodic optical pattern.

According to a further aspect of the invention there is provided computer program code comprising instructions which, when executed by a controller, causes the machine controller to control a probe comprising at least one imaging device and image analyser in accordance with the above described methods.

According to a yet further aspect of the invention there is provided a computer readable medium, bearing computer program code as described above.

As will be understood, features described in connection with the first aspect of the invention are also applicable to the other aspects of the invention where appropriate.

Accordingly, this application describes, a non-contact measurement apparatus, comprising: a probe for mounting on a coordinate positioning apparatus, the probe comprising a projector for projecting a structured light pattern onto the surface of an object to be measured, and an image sensor for imaging the structured light pattern on the surface of the object; an image analyser configured to analyse at least one first image of an object on which a structured light pattern is projected, the first image being obtained from a first known perspective, and at least one second image of the object on which the structured light pattern is projected, the second image being obtained from a second known perspective, so as to: a) identify at least one target feature on the object to be measured and to determine the position of the target feature on the object relative to the image sensor; and b) determine topographical data regarding the surface on which the structured light pattern is projected from at least one of the first and second images.

An embodiment of the invention will now be described, by way of example only, with reference to the following Figures, in which.

Figure 1:
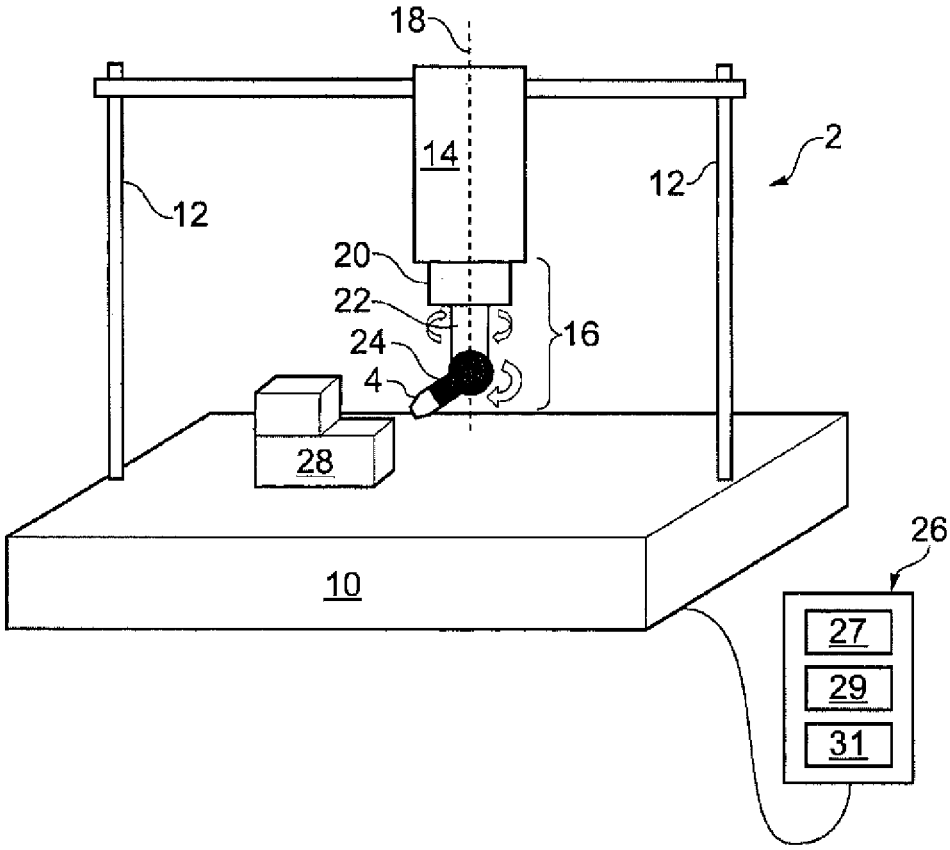
FIG. 1 shows a schematic perspective view of a coordinate measuring machine on which a probe for measuring an object via a non-contact method according to the present invention is mounted.

Referring to FIG. 1, a coordinate measuring machine (CMM) 2 on which a measurement probe 4 according to the present invention is mounted, is shown.

The CMM 2 comprises a base 10, supporting a frame 12 which in turn holds a quill 14. Motors (not shown) are provided to move the quill 14 along the three mutually orthogonal axes X, Y and Z. The quill 14 holds an articulating head 16. The head 16 has a base portion 20 attached to the quill 14, an intermediate portion 22 and a probe retaining portion 24. The base portion 20 comprises a first motor (not shown) for rotating the intermediate portion 22 about a first rotational axis 18. The intermediate portion 22 comprises a second motor (not shown) for rotating the probe retaining portion 24 about a second rotational axis that is substantially perpendicular to the first rotational axis. Although not shown, bearings may also be provided between the moveable parts of the articulating head 16. Further, although not shown, measurement encoders may be provided for measuring the relative positions of the base 10, frame 12, quill 14, and articulating head 16 so that the position of the measurement probe 4 relative to a workpiece located on the base 10 can be determined.

The probe 4 is removably mounted (e.g. using a kinematic mount) on the probe retaining portion 24. The probe 4 can be held by the probe retaining portion 24 by the use of corresponding magnets (not shown) provided on or in the probe 4 and probe retaining portion 24.

The head 16 allows the probe 4 to be moved with two degrees of freedom relative to the quill 14. The combination of the two degrees of freedom provided by the head 16 and the three linear (X, Y, Z) axes of translation of the CMM 2 allows the probe 4 to be moved about five axes.

A controller 26 comprising a CMM controller 27 for controlling the operation of the CMM 2 is also provided, and a probe controller 29 for controlling the operation of the probe 4 and an image analyser 31 for analysing the images obtained form the probe 4. The controller 26 may be a dedicated electronic control system and/or may comprise a personal computer.

The CMM controller 27 is arranged to provide appropriate drive currents to the first and second motors so that, during use, each motor imparts the required torque. The torque imparted by each motor may be used to cause movement about the associated rotational axis or to maintain a certain rotational position. It can thus be seen that a drive current needs to be applied continuously to each motor of the head 16 during use; i.e. each motor needs to be powered even if there is no movement required about the associated rotational axis.

It should be noted that FIG. 1 provides only a top level description of a CMM 2. A more complete description of such apparatus can be found elsewhere; for example, see EP402440 the entire contents of which are incorporated herein by this reference.

Figure 11:
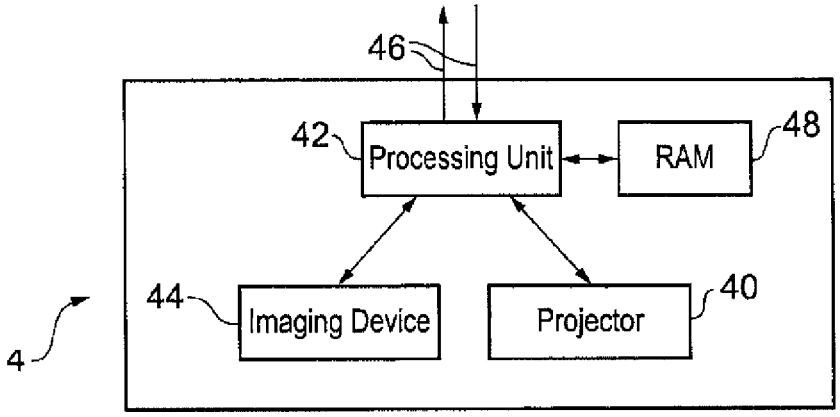
FIG. 11 is a schematic diagram of the components of the probe shown in FIG. 1.

Referring now to FIG. 11, the probe 4 comprises a projector 40 for projecting, under the control of a processing unit 42 a fringe pattern onto the object 28, an imaging device 44 for obtaining, under the control of the processing unit 42 an image of the object 28 onto which the fringe pattern is projected. As will be understood, the imaging device 44 comprises suitable optics and sensors for capturing images of the object 28. In the embodiment described, the imaging device comprises an image sensor, in particular a CCD defining an image plane 62. The imaging device 44 also comprises a lens (not shown) to focus light at the image plane 62.

The processing unit 42 is connected to the probe controller 29 and image analyser 31 in the controller unit 26 such that the processing unit 42 can communicate with them via a communication line 46. As will be understood, the communication line 46 could be a wired or wireless communication line. The probe 4 also comprises a random access memory (RAM) device 48 for temporarily storing data, such as image data, used by the processing unit 42.

As will be understood, the probe 4 need not necessarily contain the processing unit 42 and/or RAM 48. For instance, all processing and data storage can be done by a device connected to the probe 4, for instance the controller 26 or an intermediate device connected between the probe 4 and controller 26.

Figure 12:
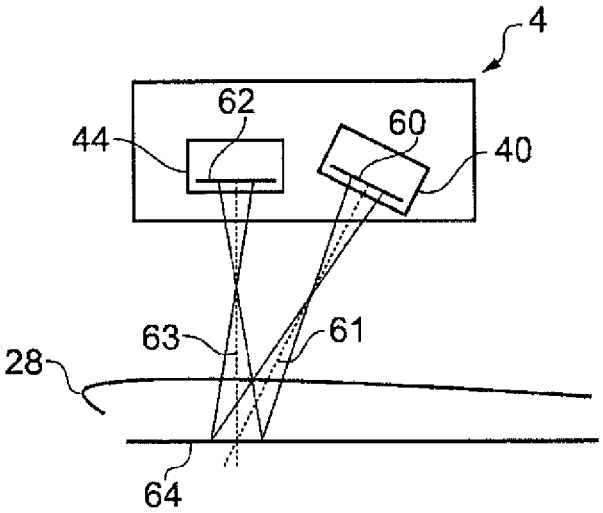
FIG. 12 is a schematic diagram of the positional relationship of the imaging device and projector of the probe shown in FIG. 11.

As illustrated in FIG. 12, the projector's 40 image plane 60 and the imaging device's 44 image plane 62 are angled relative to each other such that the projector's 40 and imaging device's optical axes 61, 63 intersect at a reference plane 64. In use, the probe 4 is positioned such that the fringes projected onto the object's surface can be clearly imaged by the imaging device 44.

Figure 13:
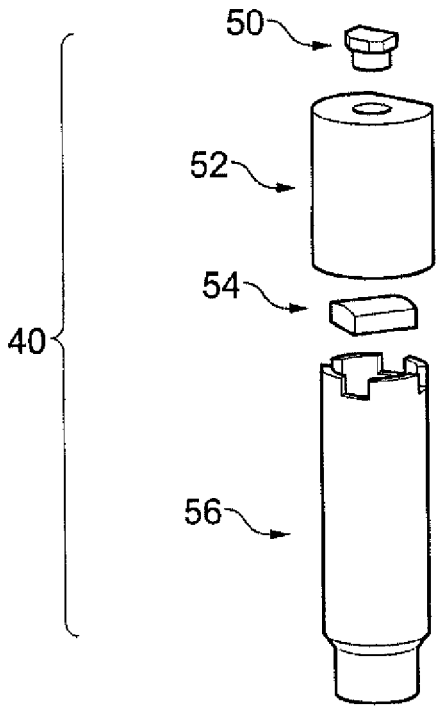
FIG. 13 is a schematic diagram of the projector shown in FIG. 11.

With reference to FIG. 13, the projector 40 comprises a laser diode 50 for producing a coherent source of light, a collimator 52 for collimating light emitted from the laser diode 50, a grating 54 for producing a sinusoidal set of fringes, and a lens assembly 56 for focussing the fringes at the reference plane 64. As will be understood, other types of projectors would be suitable for use with the present invention. For instance, the projector could. comprise a light source and a mask to selectively block and transmit light emitted from the projector in a pattern.

In the described embodiment, the periodic optical pattern projected by the projector 40 is a set of sinusoidal fringes. However, as will be understood, other forms of structured light could be projected, such as for example a set of parallel lines having different colours or tones (e.g. alternating black and white lines, or parallel red, blue and green lines), or even for example a set of concentric circles.

Referring to FIGS. 2 to 10, the operation of the probe 4 will now be described.

Figure 4:
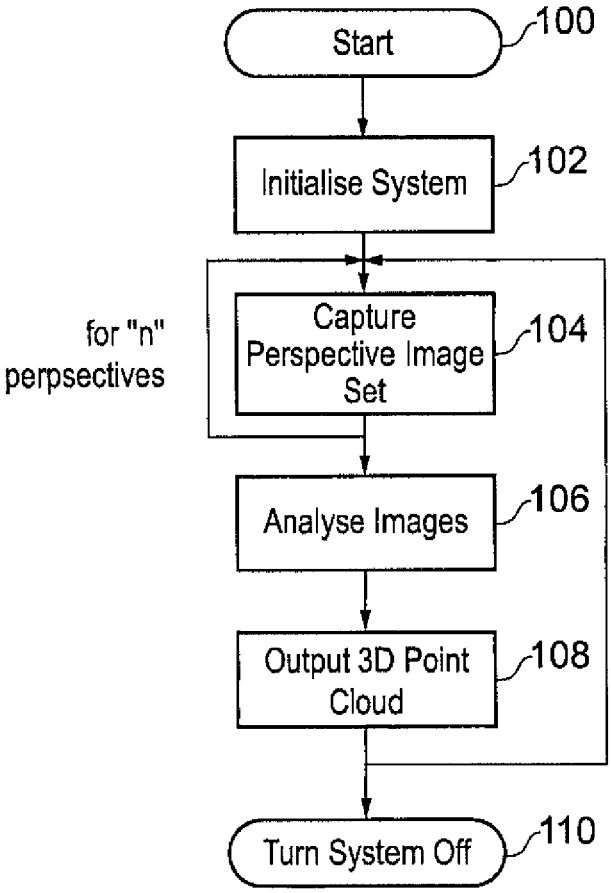
FIG. 4 shows a flow chart illustrating the high-level operation of the apparatus shown in FIG. 1.

Referring first to FIG. 4, the operation begins at step 100 when the operator turns the CMM 2 on. At step 102, the system is initialised. This includes loading the probe 4 onto the articulating head 16, positioning the object 28 to be measured on the base 10, sending the CMM's encoders to a home or reference position such that the position of the articulating head 16 relative to the CMM 2 is known, and also calibrating the CMM 2 end probe 4 such that the position of a reference point of the probe 4 relative to the CMM 2 is known.

Once initialised and appropriately calibrated, control passes to step 104 at which point a set of images of the object 28 is obtained by the probe 4. This step is performed a plurality of times so that a plurality of image sets are obtained, wherein each set corresponds to a different perspective or view point of the object 28. In the example described, three sets of images are obtained corresponding to three different perspectives. The process of obtaining a set of images is explained in more detail below with respect to FIG. 5.

Once all of the images have been obtained, the images are analysed at step 106 by the image analyser 31 in the controller 26. The image analyser 31 calculates from the images a set of three dimensional ("3D") coordinates relative to the CMM 2 which describe the shape of the object 28. The method of analysing the images will be described in more detail below with reference to FIG. 7. The 3D coordinates are then output at step 108 as a 3D point cloud. As will be understood, the 3D point cloud could be stored on a memory device for later use. The 3D point cloud data could be used to determine the shape and dimensions of the object and compare it to predetermined threshold data to assess whether the object 28 has been made within predetermined tolerances. Optionally, the 3D point cloud could be displayed on a graphical user interface which provides a user with virtual 3D model of the object 28.

The operation ends at step 110 when the system is turned off. Alternatively, a subsequent operation could be begun by repeating steps 104 to 108. For instance, the user might want to obtain multiple sets of measurement data for the same object 28, or to obtain measurement data for a different object.

Figure 5:
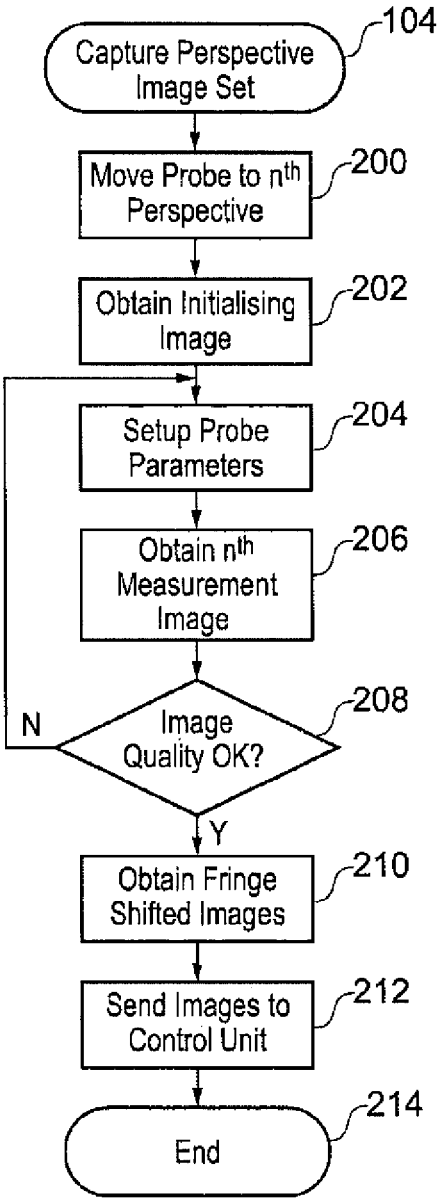
FIG. 5 illustrates the method of capturing a perspective image set.

Referring now to FIG. 5, the process 104 of capturing an image set for a perspective will now be described. The process begins at step 200 at which point the probe 4 is moved to a first perspective. In the described embodiment, the user can move the probe 4 under the control of a joystick (not shown) which controls the motors of the CMM 2 so as to move the quill 14. As will be understood, the first (and subsequent) perspective could be predetermined and loaded into the CMM controller 27 such that during the measurement operation the probe 4 is automatically moved to the predetermined perspectives. Further, on a different positioning apparatus, the user could physically drag the probe 4 to the perspectives, wherein the positioning apparatus monitors the position of the probe 4 via, for example, encoders mounted on the moving parts of the apparatus.

Once the probe 4 is positioned at the first perspective, an initialising image is obtained at step 202. This involves the probe controller 29 sending a signal to the processing unit 42 of the probe 4 such that it operates the imaging device 44 to capture an image of the object 28.

The initialising image is sent back to the image analyser 31 and at step 204, the image is analysed for image quality properties. This can include, for example, determining the average intensity of light and contrast of the image and comparing them to predetermined threshold levels to determine whether the image quality is sufficient to perform the measurement processes. For example, if the image is too dark then the imaging device 44 or projector 40 properties could be changed so as to increase the brightness of the projected fringe pattern and/or adjust the expose time or gain of the imaging device 44. The initialising image will not be used in subsequent processes for obtaining measurement data about the object 28 and so certain aspects of the image, such as the resolution of the image, need not be as high as that for the measurement images as discussed below. Furthermore, in alternative embodiments, a light sensor, such as a photodiode, separate to the imaging device could be provided in the probe to measure the amount of light at a perspective position, the output of the photodiode being used to set up the projector 40 and/or imaging device 44.

Once the projector 40 and imaging device 44 have been set up, the first measurement image is obtained at step 206. What is meant by a measurement image is one which is used in the "analyse images" process 106 described in more detail below. Obtaining the first measurement image involves the probe controller 29 sending a signal to the processing unit 42 of the probe 4 such that the processing unit 42 then operates the projector 40 to project a fringe pattern onto the object 28 and for the imaging device 44 to simultaneously capture an image of the object 28 with the fringe pattern on it.

The first measurement image is sent back to the image analyser 31 and at step 208, the first measurement image is again analysed for image quality properties. If the image quality is sufficient for use in the "analyse images" process 106 described below, then control is passed to step 210, otherwise control is passed back to step 204.

At step 210, fringe shifted images are obtained for the current perspective. Fringe shifted images are a plurality of images of the object from substantially the same perspective but with the position of the fringes being slightly different in each image. The method this step is described in more detail below with respect to FIG. 6.

Once the fringe shifted images have been obtained, all of the images are then sent back to the imager analyser 31 for analysis at step 212. As will be understood, data concerning the position and orientation that the probe 4 was at when each image was obtained will be provided to the image analyser 31 along with each image, such that 3D coordinates of the object 28 relative to the CMM 2 can be obtained as explained in more detail below. The process then ends at step 214.

As explained above, the capture perspective image set process 104 is repeated a plurality of times for a plurality of different perspectives. In this described example, the capture perspective image set process is performed three times, for first, second and third perspectives. The probe 4 is moved to each perspective either under the control of the user or controller as explained above.

Figure 6:
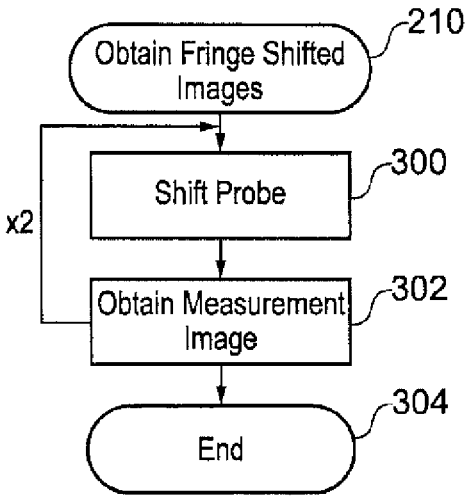
FIG. 6 illustrates the method of obtaining fringe shifted images.

With reference to FIG. 6, the process 210 for obtaining the fringe shifted images will now be described. The fringes projected on the object 28 are shifted by physically moving the probe 4 by a small distance in a direction such that the position of the fringes on the object 28 are different from the previous position. As the probe 4 is shifted, the projector 40 within it, and hence the projector's optical axis 61, will also be shifted relative to the object 28. This is what provides the change in position of the fringes of the object 28.

In one embodiment, the probe 4 is moved in a direction that is parallel to the imaging device's 44 image plane and perpendicular to the length of the fringes.

However, this need not necessarily be the case, so long as the position of the fringes on the object is moved. For example, the hinge shifting could be achieved by rotating the probe 4. For instance, the probe 4 could be rotated about an axis extending perpendicular to the projector's image plane 60. Optionally the probe could be rotated about an axis extending perpendicular to the imaging device's 44 image plane. In another preferred embodiment the probe 4 can be rotated about the imaging device's 44 perspective centre. This is advantageous because this ensures that the perspective of the features captured by the imaging device 44 across the different images will be the same. It also enables any processing of the images to compensate for relative movement of the object and image sensor to be done without knowledge of the distance between the object and image sensor.

Figure 17:
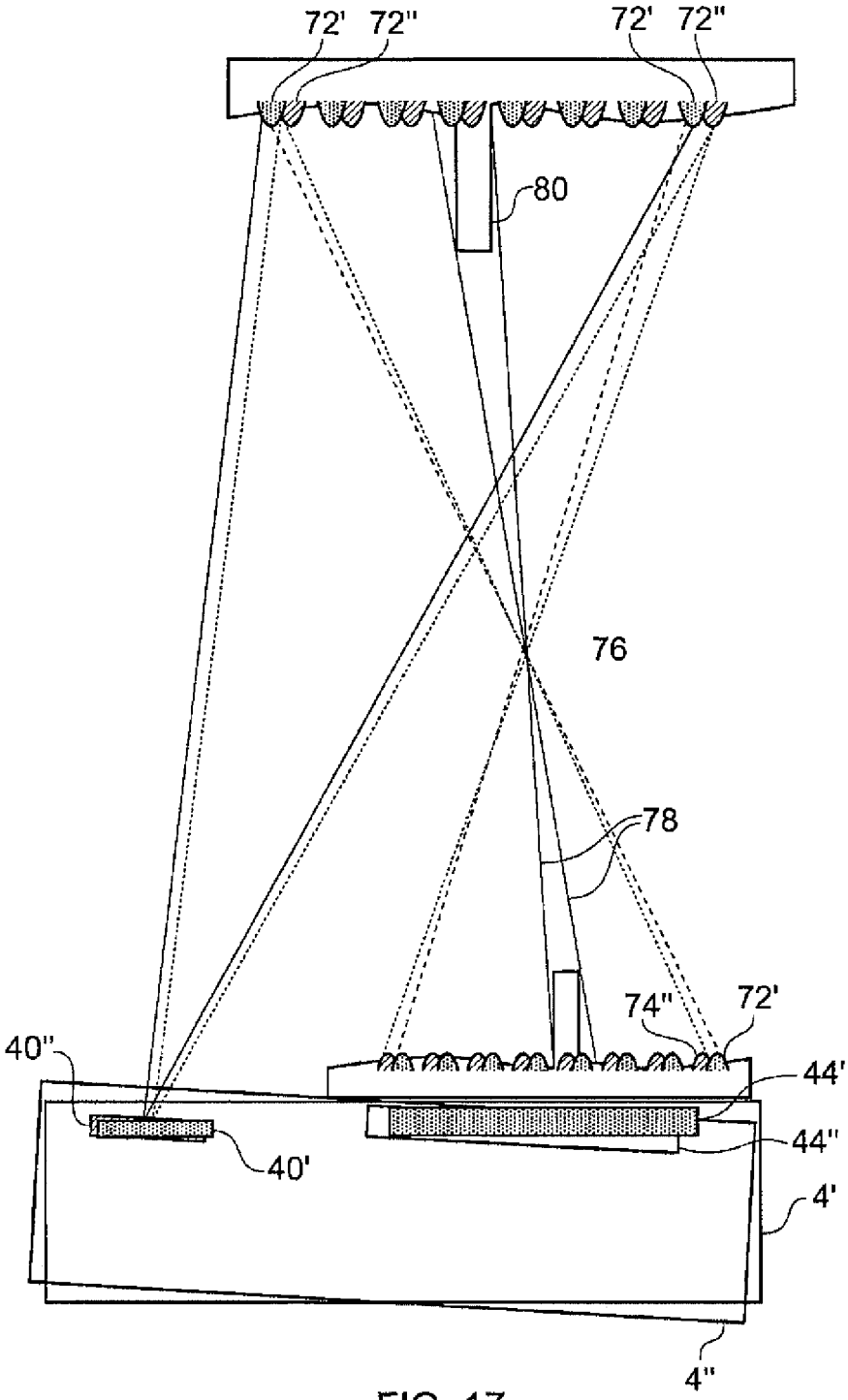
FIG. 17 illustrates obtaining fringe shifted images by causing rotation about the image sensor's perspective centre.

For example, with reference to FIG. 17 the probe 4 is located at a first position (referred to by reference numeral 4') relative to an object 70 to be inspected. At this instance the probe's projector 40 is at a first position (referred to by reference numeral 40') which projects a fringe pattern illustrated by the dotted fringe markings 72' on the object 70. An image 74 of the object with the fringe markings 72' is captured by the imaging device 44 which is at a first position referred to by reference numeral 44'.

The probe 4 is then moved to a second position, referred to by reference numeral 4", by rotating the probe 4 relative to the object 70 about the imaging device's perspective centre. As will be understood, an imaging device's perspective centre is the point through which all light rays that intersect with the image plane are assumed to pass. In the figure shown, the perspective centre is referred to by reference numeral 76.

As can be seen, at the second position the projector, referred to by reference numeral 40", has moved such that the position of the fringe pattern on the object 70 has moved. The new position of the fringe pattern on the object 70 is illustrated by the striped fringe markings 72" on the object 70. An image 74 of the object is captured by the imaging device at its second position 44". As can be seen, although the position of the image of the object on the imaging device 44 has changed between the first 44' and second 44" positions of the imaging device, the perspective the imaging device 44 has of the object 70 does not change between the positions. Accordingly, for example, features that are hidden due to occlusion in one image will also be hidden due to occlusion in the second. This is illustrated by the rays 78 illustrating the view the imaging device 44 has of the tall feature 80 on the object. As can be seen, because the imaging device 44 is rotated about its perspective centre, the rays 78 are identical for both positions and so only the location of the feature on the imaging device 44 changes between the positions, not the form of the feature itself.

Accordingly, rotating about the perspective centre can be advantageous as the image sensor's perspective of the object does not change thereby ensuring that the same points on the object are visible for each position. Furthermore, for any point viewed, the distance between the image points of it before and after the relative rotation of camera and object is independent of the distance to the object. That is, for an unknown object, if the camera is rotated about its own perspective centre it is possible to predict, for each imaged point before the rotation, where it will be imaged after rotation. The position of an image point after the rotation depends on the position of the initial image point, the angle (and axis) of rotation, and the internal camera parameters—all known values. Accordingly, as is described in more detail below, rotating about the perspective centre allows the relative motion to be compensated for without knowing the distance to the object.

The probe 4 is moved a distance corresponding to a fringe shift of ¼ period at the point where the imaging device's 44 optical axis 63 intersects the reference plane 64. As will be understood, the actual distance the probe 4 is moved will depend on the period of the fringes projected and other factors such as the magnification of the projector 40.

Once the probe 4 has been shifted, another measurement image is obtained at step 302. The steps of shifting the probe 300 and obtaining a measurement image 302 is repeated two more times. Each time, the probe is shifted so that for each measurement image the position of the fringe pattern on the object is different for all previous images. Accordingly, at the end of the obtain fringe shifted images process 210 four images of the object have been obtained for a given perspective, with the position of the fringe pattern on the object for each image being slightly different.

Figure 2:
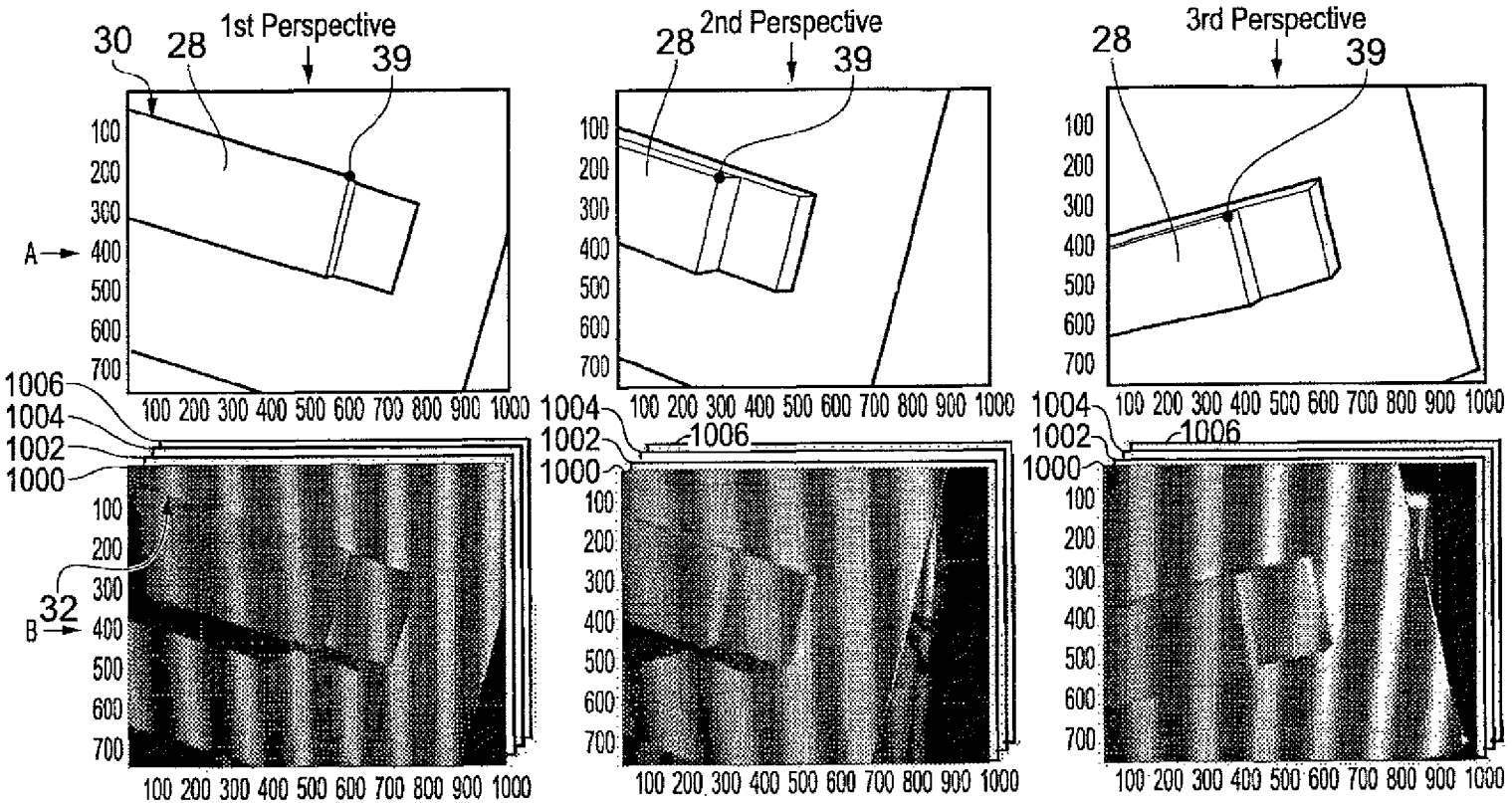
FIG. 2 illustrates various images of the object shown in FIG. 1 obtained by the probe from three different perspectives.

Reference is now made to FIG. 2. Row A shows the view of the object 28 at each of the three perspectives with no fringes projected onto it. Row B illustrates, for each of the first, second and third perspectives the image 1000 that will be obtained by the imaging device 44 at step 206 of the process for capturing a perspective image set 104. Schematically shown behind each of those images 1000 are the fringe shifted images 1002, 1004 and 1006 which are obtained during execution of steps 300 and 302 for each of the first, second and third perspectives. FIGS. 14(a) to 14(d) shows an example of the images 1000-1006 obtained for the first perspective. As shown, the relative position of the object and imaging device has moved slightly between obtaining each image in an image set for a perspective, and this needs to be taken into consideration and/or compensated for during processing of the images as described in more detail below (especially as described in connection with FIG. 8).

Accordingly, once the step 104 of capturing the first, second and third image sets has been completed, the image analyser 31 will have a set of images 1000-1006 for each of the first, second and third perspectives.

Figure 7:
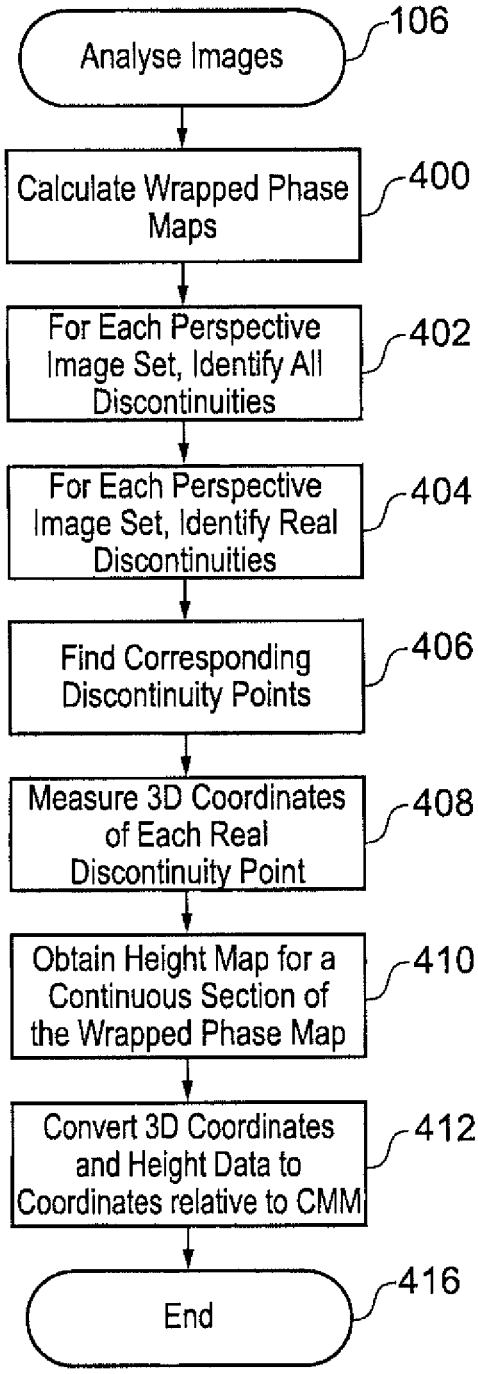
FIG. 7 illustrates the method of analysing the images.

The process 106 for analysing the images will now be described with reference to FIG. 7. The process begins at step 400 at which point four wrapped phase maps are calculated for each of the first, second and third perspectives. As will be understood, a wrapped phase map is a map which contains the phase of the fringes projected onto the object's surface for a plurality of pixels in one of the measurement images in a perspective image set, where the phase angle is bound within a range of 360 degrees.

For a given perspective, a wrapped phase map is obtained using each of the four phase shifted images for that perspective in a particular order. The four wrapped phase maps for a given perspective are obtained by using each of the four phase shifted images in different orders. The method for obtaining a wrapped phase map will be explained in more detail below with reference to FIG. 8.

As will be understood, it need not be necessary to calculate four wrapped phase maps for each perspective. For instance, two or more wrapped phase maps could be calculated for each of the perspectives. As will be understood, the more wrapped phase maps that are calculated, the more reliable the determination of real discontinuities as explained in more detail below, but the more processing resources required.

Figure 3:
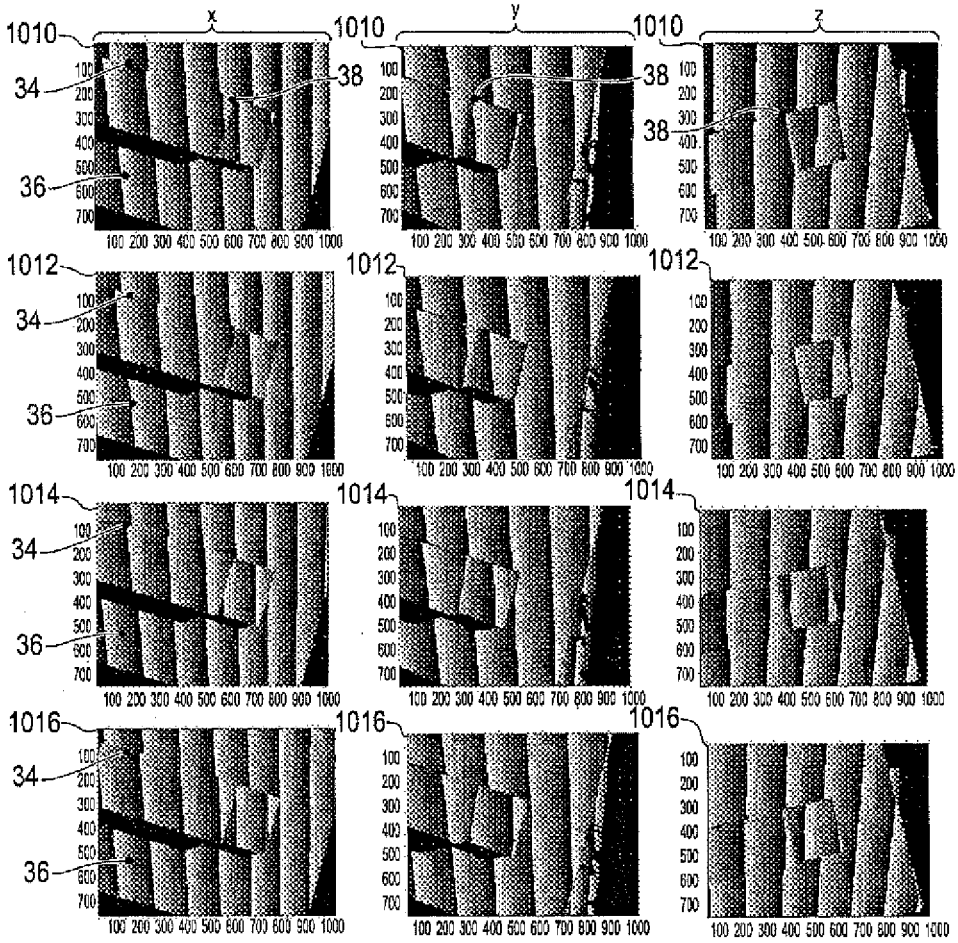
FIG. 3 illustrates a plurality of wrapped phase maps for each of the three different perspectives.

Referring to FIG. 3, columns X, Y and Z illustrate for each of the different perspectives four different wrapped phase maps 1010, 1012, 1014 and 1016. Each of those wrapped phase maps for a given perspective has been calculated using a unique order of the four different images 1002-1006 for that perspective. Four different wrapped phase maps 1010-1016 for each perspective are calculated in order to be able to distinguish between those discontinuities caused by features on the object 28 and those discontinuities caused by the wrapping of the phase, as explained in more detail below.

As can be seen from the images in row B of FIG. 2, a feature, such as an edge or corner on the object 28 causes a discontinuity in the fringe pattern. For example, edge 30 on the object 28 causes a discontinuity in the fringe pattern along line 32 in the image of the object 28 with the fringe projected on it. Accordingly, it is possible to identify features of the object 28 by identifying discontinuities in the fringe pattern.

At step 402, discontinuities in the fringe pattern are identified for each of the perspectives. This is achieved by identifying discontinuities in each of the wrapped phase maps. A discontinuity in a wrapped phase map is identified by comparing the phase value of each pixel to the phase values of adjacent surrounding pixels. If the difference in the phase value between adjacent pixels is above a threshold level, then one of those pixels identifies a discontinuity point. As will be understood, it is not important which one of those pixels is selected as the discontinuity point so long as the selection criteria is consistent for the selection of all discontinuity points, e.g. always select the pixel to the left or to the top of the difference, depending on whether the differences between adjacent pixels are being calculated in the x or y direction along the image. As will be understood, the positions of the discontinuities, once found by the above described method, can be refined if required using image processing techniques, for example by looking at the gradient of the phase, or the gradient of the intensities in the measurement images in the surrounding region, in order to find the location of the discontinuity to sub-pixel accuracy, for example as described in J. R. Parker, "Algorithms for image processing and computer vision", John Wiley and Sons, Inc (1997).

The preferred threshold level depends on a number of factors including the object shape, level of noise in the image and period of the fringe pattern. The threshold level could be set by a user prior to the operation or could be calculated from an analysis of the image itself.

For example, referring to the first wrapped phase map 1010 (in FIG. 3) for the first perspective, a discontinuity will be identified between adjacent pixels at point 34 due to the difference in the phase value caused by the distortion along line 32 of the fringe due to the edge 30. This discontinuity will also be identified in the other wrapped phase maps 1012, 1014 and 1016 at the same point 34.

Other discontinuities will also be identified in the wrapped phase maps 1010-1016, such as for example all the way along line 32, which corresponds to the edge 30.

It is possible that the above process could result in false discontinuities being identified due to the phase map being wrapped. For example, adjacent pixels might have phase values of, for instance, close to 0 degrees and 360 degrees respectively. If so, then it would appear as if there has been a large phase jump between those pixels and this would be identified as a discontinuity. However, the phase jump has merely been caused as a result of the wrapping around of the phase, rather than due to a discontinuity in the surface of the object being measured. An example of this can be seen in the first wrapped phase map 1010 for the first perspective at point 36 where the phase values jump from 360 degrees to 0 degrees (illustrated by the dark pixels and light pixels respectively). The phase value for adjacent pixels will jump significant at point 36 due to the phase map being wrapped.

Accordingly, once all discontinuities have been identified for each of the four wrapped phase maps for a given perspective, then falsely identified discontinuities are removed at step 404. This is achieved by comparing the discontinuities for each of the wrapped phase maps for a given perspective, and only keeping the discontinuities that appear in at least two of the four wrapped phase maps. As will be understood, a more stringent test could be applied by, for example, only keeping the discontinuities that appear in three or four of the wrapped phase maps. This can help overcome problems caused by noise on the images. This process 404 is performed for each of the first to third perspective image sets.

For example, as mentioned above a discontinuity would have been identified at point 36 in the first wrapped phase map 1010 for the first perspective. However, when looking at the other wrapped phase maps 1012 to 1016 for the first perspective, a discontinuity would not have been identified at that same point 36. This is because the different wrapped phase maps have been calculated using a different order of the fringe shifted images 1000 to 1006, thereby ensuring that the phase wrapping in the wrapped phase maps occurs at different points. Accordingly, as the discontinuity identified at point 36 in the first wrapped phase map 1010 is not also identified in the other wrapped maps 1012 to 1016, then that discontinuity can be discarded.

However, as the discontinuity at point 34 in the first wrapped phase map 1010 has been confirmed by discontinuities identified at the same point 34 in all the other wrapped phase maps 1012 to 1014, point 34 is identified as a real discontinuity, i.e. a discontinuity caused by a feature on the object 28, rather than as a result of phase wrapping.

At step 406, corresponding discontinuity points between each of the perspectives are identified. Corresponding discontinuity points are those points in the wrapped phase maps which identify a discontinuity caused by the same feature on the object 28. For example, discontinuity point 38 on each of the first wrapped phase maps 1010 for each of the first, second and third perspectives all identify the same corner 39 on the object 28. Corresponding discontinuity points can be determined by known matching techniques and, for example, utilising epipolar geometry. Such known techniques are described, for example in A. Gruen, "Least squares matching: a fundamental measurement algorithm" in K. B. Atkinson (ed.), "Close range photogrammetry and machine vision", Whittles Publishing (2001). The correlated discontinuity points can then be used as target points, the 3D coordinates of which relative to the probe 4 can be determined at step 408 by known photogrammetry techniques, such as those described in, for example, M. A. R Cooper with S. Robson, "Theory of close-range photogrammetry" in K. B. Atkinson (ed.), "Close range photogrammetry and machine vision", Whittles Publishing (2001).

Accordingly, after step 408 a number of discrete points on the object 28 will have been identified and their position relative to the probe 4 measured.

At step 410, a height map for a continuous section of the object 28 is calculated. A height map provides information on the height of the surface above a known reference plane 6 relative to the probe 4. A continuous section is an area of the object enclosed by discontinuous features, e.g. the face of a cube which is enclosed by four edges. Continuous sections can be identified by identifying those areas in the wrapped phase map which are enclosed by discontinuity points previously identified in steps 402 to 406. The height map provides measurement data on the shape of the surface between those discrete points. Methods for obtaining the height map for a continuous section are described below in more detail with respect to FIGS. 9 and 10. Steps 410 could be performed a plurality of times for different continuous sections for one or more of the different perspectives.

As is usual in similar fringe analysis systems, the unwrapped phase map is correct only to some unknown multiple of 2π radians, and therefore the height above the reference plane 64 may be wrong by whatever height corresponds to this unknown phase difference. This is often called 2π ambiguity. The measured 3D coordinates of the real discontinuities obtained in step 408 are used in order to resolve these ambiguities.

At this stage, the 3D coordinates of the real discontinuity points obtained in step 408 and the height map data obtained in step 410 provide the position of the object relative to a predetermined reference point in the probe 4. Accordingly, at step 412, these coordinates are converted to 3D coordinates relative to the CMM 2. This can be performed using routine trigonometry techniques as the relative position of the CMM 2 and the reference point in the probe 4 is known from calibration, and also because the position and orientation of the probe 4 relative to the CMM 2 at the point each image was obtained was recorded with each image.

Figure 8:
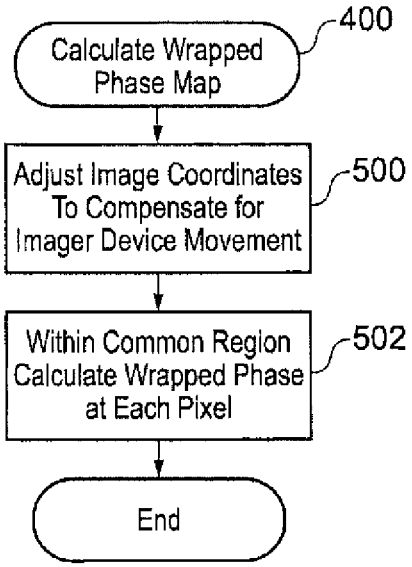
FIG. 8 illustrates the method of calculating the wrapped phase maps.

The process for calculating a wrapped phase map 400 will now be described with reference to FIG. 8. Calculating a wrapped phase map comprises calculating the phase for each pixel for one of a set of fringe-shifted images. This can be done using various techniques, the selection of which can depend on various factors including the method by which the fringe-shifted images are obtained. Standard phase-shifting algorithms rely on that the relative position between the object and imaging device 44 is the same across all of the fringe-shifted images. However, if either of the methods described above (e.g. either moving the probe 4 laterally or rotating it about the imaging device's perspective centre) are used to obtain the fringe-shifted images then the imaging device 44 will have moved a small distance relative to the object. Accordingly, for each successive image in a perspective image set, a given pixel in each image will be identifying the intensity of a different point on the object. Accordingly, if standard phase-shifting algorithms are to be used it is necessary to identify across all of the fringe shifted images which pixels correspond to same point on the object, and to then compensate for this. One way of doing this when the imaging device 44 has moved laterally is to determine by how much and in what direction the imaging device 44 has traveled between each image, and by then cropping the images so that each image contains image data common to all of them. For example, if the movement of the imaging device 44 between two images means that a point on an object has shifted five pixels in one dimension, then the first image can be cropped to remove five pixel widths worth of data.

Figure 15:
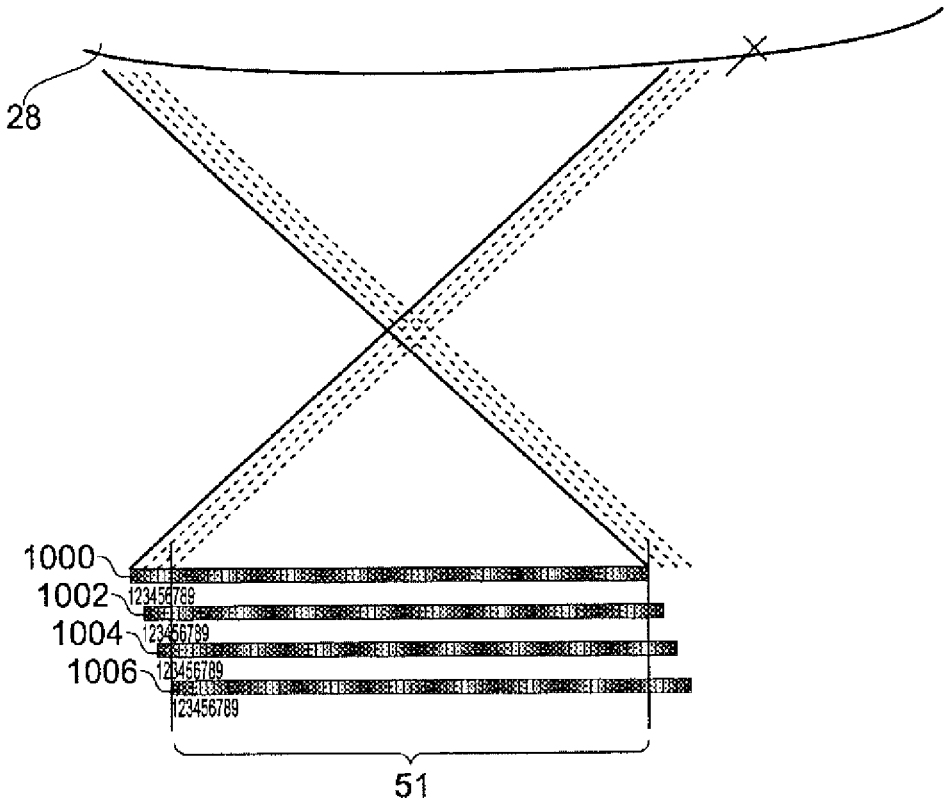
FIG. 15 illustrates the effect of moving the image sensor relative to the object.

This can be seen more clearly with reference to FIG. 15 which schematically illustrates corresponding rows of pixels for each of the first 1000, second 1002, third 1004 and fourth 1006 images. As can be seen, due to relative movement of the imaging device 44 and the object 28 between the images, the same point on an object is imaged by different pixels in each image. For instance, point X on the object 28 is imaged by the $7^{th}$ pixel from the left for the first image 1000, the $5^{th}$ pixel from the left for the second image 1002, the $3^{rd}$ pixel from the left for the third image 1004 and the $4^{th}$ pixel from the left for the fourth image 1006. An effective way of compensating for the relative movement of image sensor and object 28 is to crop the image data such that each image 1000-1006 contains a data representing a common region, such as that highlighted by window 51 in FIG. 15.

Figure 18:
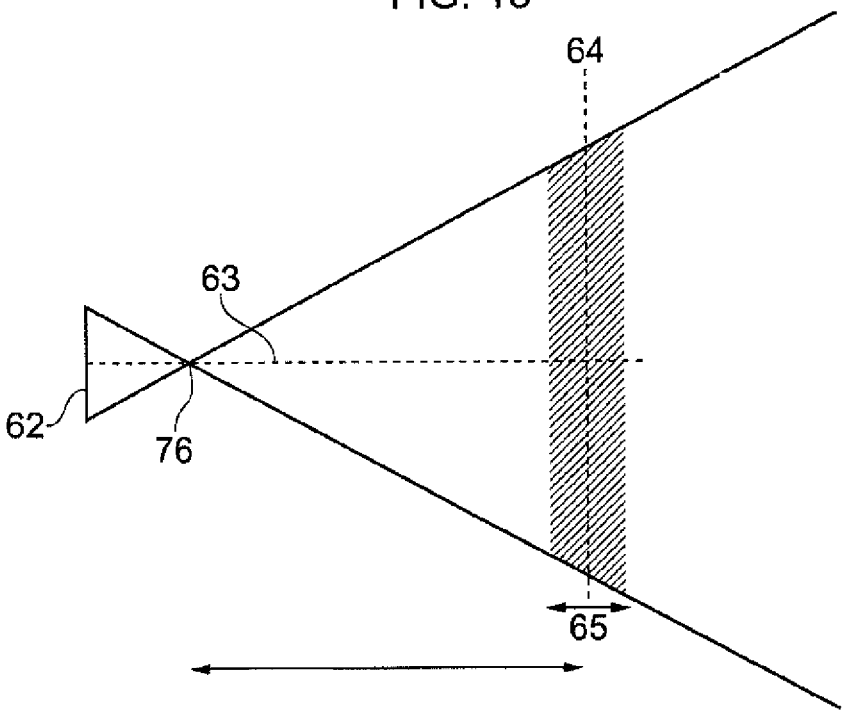
FIG. 18 illustrates the stand-off distance and depth of field of an imaging device.
Figure 14:
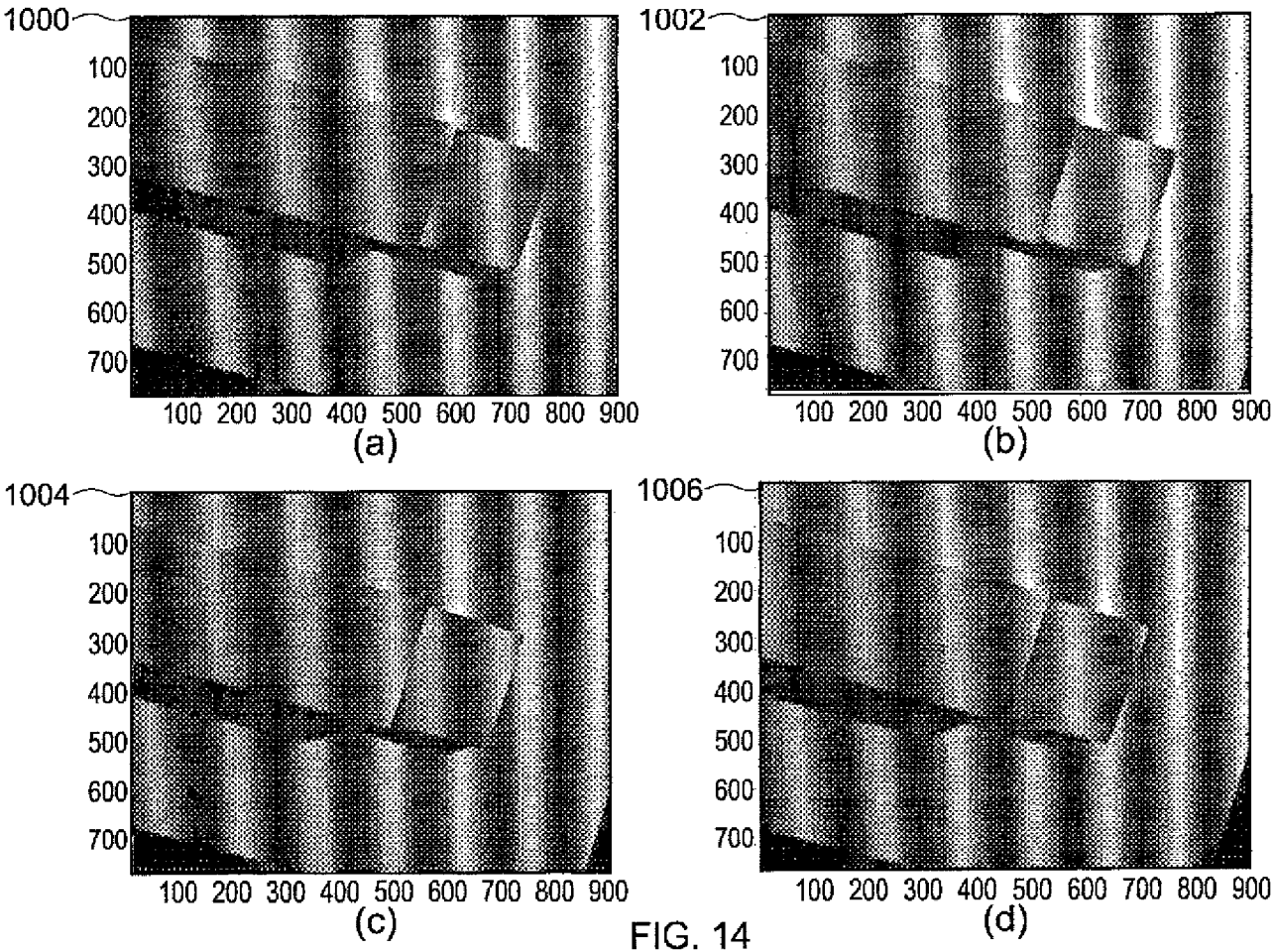
FIG. 14 illustrates a set of fringe shifted images, the position of the fringe on the object being different in each image.

Cropping the images is one example of a coordinate transformation, where the transformation is a linear function. This can be most accurate in situations where the distance to the object is known, or, for instance, where the stand-off distance is large compared to the depth of the measuring volume. As will be understood, and with reference to FIG. 18, the stand-off distance is the distance from the imaging device's perspective centre 76 to the centre of the imaging device's measurement volume and the depth of field 65 or depth of measurement volume is the range over which images recorded by the device appear sharp. In other words, the stand-off distance is the nominal distance from the probe 4 to the object to be measured. For instance, if the ratio of stand-off distance to depth of measuring volume is around 10:1 then there can be an error of up to 10% in the compensation for some pixels. If either the stand-off distance is not large compared to the depth of the measuring volume, or if the relative motion is not a linear translation, then the most appropriate coordinate transformation to compensate for relative motion of the imaging device and the object can depend, in general on the distance to the object and the actual motion. However, it has been found that if the motion is rotation about the imaging device's 44 perspective centre then the coordinate transformation that best compensates for the motion is independent of the unknown distance to the object. This is due to the geometry of the system and the motion. Furthermore, this enables accurate compensation to be performed even if the stand-off distance is not large compared to the depth of the measuring volume, for instance in situations in which the ratio of stand-off distance to depth of measuring volume is less than 10:1, for example less than 5:1, for instance 1:1. Accordingly, this enables measurement of an object to be performed even when the probe is located close to the object.

Once the pixel data has been compensated for the relative motion so that the same pixel in each adjusted image represents the same point on the object, the next step 502 involves using a phase-shifting algorithm to calculate the wrapped phase at each pixel. A suitable phase-shifting algorithm not requiring known phase shift, for instance the Carré algorithm, may be used to calculate the wrapped phase, phase shift and modulation amplitude.

The process for calculating a wrapped phase map 400 is repeated three further times for each perspective image set, each time using the phase shifted images in a different order, so as to obtain four wrapped phase maps for each perspective. Accordingly, in the process for calculating the wrapped phase maps 400 is performed twelve times in total.

Figure 9:
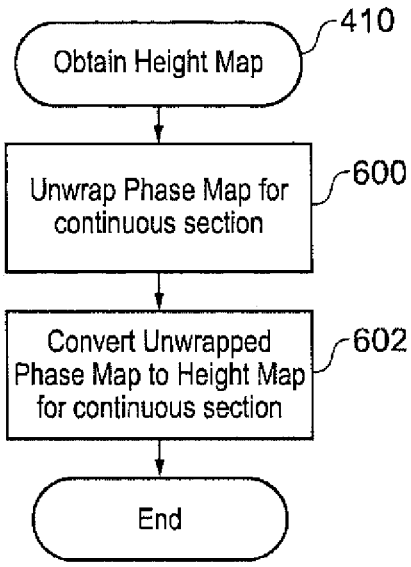
FIG. 9 illustrates a first method for obtaining a height map.
Figure 10:
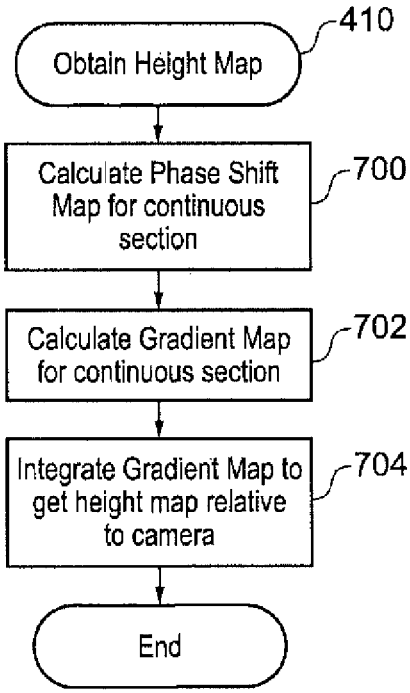
FIG. 10 illustrates the a second method for obtaining a height map.

A first process for obtaining the height map 410 will now be described with reference to FIG. 9. The method involves at step 600 unwrapping the continuous section of one of the phase maps by adding integer multiples of 360 degrees to the wrapped phase of individual pixels as required to remove the discontinuities found due to the phase calculation algorithm. The method then involves converting the unwrapped phase map to a height map for that continuous section at step 602. The phase for a pixel is dependent on the relative height of the surface of the object. Accordingly, it is possible, at step 602 to create a height map for the continuous section from that phase by directly mapping the phase value of each pixel to a height value using a predetermined mapping table and procedure.

In contrast to the methods for calculating a wrapped-phase map described above in connection with FIG. 8, i.e. in which the image coordinates are compensated for, it has been found that there is another way to calculate the wrapped phase when the object and imaging device 44 are moved relative to each other which doesn't require image coordinate compensation. This method relies on the fact that a pixel of the imaging device's 44 CCD will be viewing a different point on the object for each different image. If the points viewed by a single pixel in multiple images are at different distances to the imaging device 44, then a different phase will be recorded at that pixel in each image. That is, the phase of the fringe pattern at that pixel will be shifted between each image. The actual phase shift will depend on the distance to the object and on the gradient of the object, as well as the known relative motion of the imaging device 44 and object and the fixed system parameters. The phase shift will therefore vary across the image.

Figure 16:
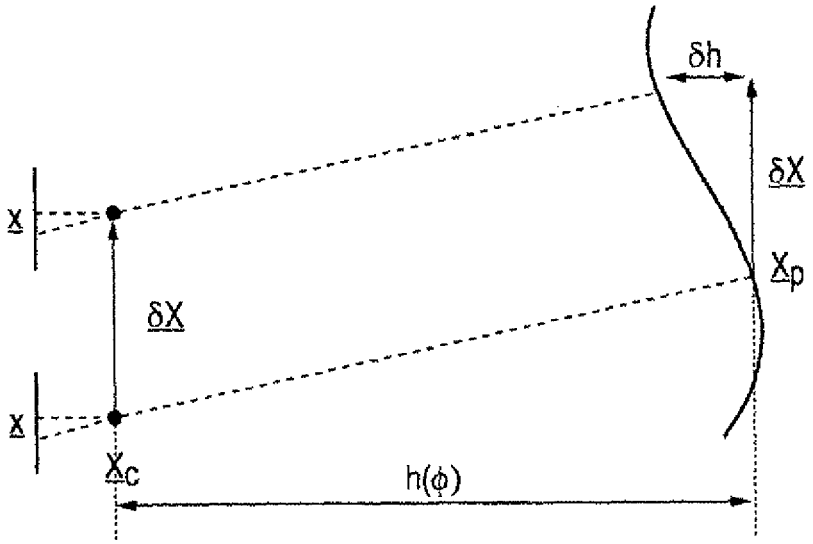
FIG. 16 illustrates how the gradient of the object surface can be determined from the phase shift.

As an example, with reference to FIG. 16, consider an object point Xp, imaged at x in the camera plane. If the imaging device 44 is translated by some vector dX with respect the plane, then the point imaged by the imaging device 44 will change, as show. For clarity, the projector 40 is omitted from the diagram, but it is to be understood that the imaging device 44 and projector 40 are fixed with respect to each other.

h is the distance from the imaging device's 44 perspective centre to the object point imaged at x, and δh is the change in this distance after translation δX. a is the known direction of the imaging device's optic axis, and $X_c$ is the position of the perspective centre, also known. The change in h due to the motion of the imaging device 44 only is equal to δX.a. If this quantity is zero, so that the motion is perpendicular to the imaging device axis and parallel to the image plane, then any remaining change in h must be due to the object shape.

The change in h is actually recorded as a change in phase, δφ, where, again, this will consist of a component caused by the shape of the object, and a component caused by any motion of the imaging device parallel to its axis.

To measure the phase at a given pixel, we take multiple phase shifted images. The intensity recorded at a pixel in image k can be expressed as $$I_k=A\pm B\cos\phi_k$$

where:

A=offset (i.e. the average intensity of the fringe pattern projected onto the object as recorded by that pixel, including any background light);

B=amplitude modulation of the light intensity recorded by that pixel; and $$\phi_k=\phi_{k-1}+\Delta\phi_k\approx\phi_k+\underline{\nabla}\phi_{k-1}\cdot\delta X_k, k>0$$

using a first order Taylor series expansion, which assumes that the translation δX is small.

The Carré algorithm is used to calculate for each pixel in a given image in an image set, the phase and phase shift and modulation amplitude from the four phase-shifted images. The Carré algorithm assumes that the four shifts in phase are equal. This will be the case, for instance, if the motion used is a translation and the surface is planar. If this is not the case then a good approximation can be obtained by choosing motion that it small enough that the surface gradient does not vary significantly over the scale of the motion.

The phase data can be converted to height data. Optionally the phase shift data can be converted to gradient data and subsequently to height data using the method described below in connection with FIG. 10.

The above described method provides optimum results when the object's reflectivity and surface gradient is substantially constant on the scale of the relative motion. Accordingly, it can be preferred that the motion between the images in an image set is small. Areas of the surface at too low or too high a gradient relative to the imaging device, or with a high degree of curvature, can be detected by inspecting the modulation amplitude returned by the Carré algorithm, and can subsequently be measured by changing the relative motion used to induce the phase shift and if necessary by viewing the object from a different perspective.

A Carré algorithm provides both phase and phase shift data for each pixel in an image. The above methods described above in connection with FIG. 9 use the phase data to obtain the height data. However, it has been possible to obtain the height information using the phase-shift data. In particular, a second process for obtaining the height map 410 will now be described with reference to FIG. 10. This method begins at step 700 by, for a continuous section (which is identifiable from the discontinuities previously identified as explained above), calculating a phase shift map using a Carré algorithm on all of the images in a perspective image set. The phase shift for a pixel is dependent on the gradient of the surface of the object and how far away the object is from the probe 4. Accordingly, it is possible, at step 702 to create a gradient map for the continuous section from that phase shift by directly mapping the phase shift value of each pixel to a gradient value using a predetermined mapping table and procedure. At step 704, the gradient map is then integrated in order to get a height map for the continuous surface relative to the probe 4. The measured 3D coordinates of the real discontinuities obtained in step 408 are used in order to resolve the constant of integration to find the height above the reference plane 64.

It is an advantage of the invention that the projector may consist simply of a grating, light source, and focussing optics. There is no need for any moving parts within the projector or for a programmable projector—only one pattern is required to be projected. Furthermore, no information about the distance to the object is required, except that it (or a section of it) is within the measuring volume—there is no requirement to have a large stand-off distance compared to the measurement volume. Furthermore, the motion between the object and probe unit need not necessarily be in any particular direction, and may be produced by a rotation rather than a translation or a combination of the two.

In the described embodiments the probe is mounted on a mounting structure equivalent to the quill of a CMM. This invention is also suitable for use with planning the course of motion of a measurement device mounted on other machine types. For example, the probe 4 could be mounted on a machine tool. Further, the probe 4 may be mounted onto the distal end of an inspection robot, which may for example comprise a robotic arm having several articulating joints.

As will be understood, the above provides a detailed description of just one particular embodiment of the invention and many features are merely optional or preferable rather than essential to the invention.

For instance, in the described embodiments the probe is mounted on a mounting structure equivalent to the quill of a CMM. This invention is also suitable for use with planning the course of motion of a measurement device mounted on other machine types. For example, the probe 4 could be mounted on a machine tool. Further, the probe 4 may be mounted onto the distal end of an inspection robot, which may for example comprise a robotic arm having several articulating joints. Furthermore, the probe 4 might be in a fixed position and the object could be moveable, for example via a positioning machine.

As will be understood, the description of the specific embodiment also involves obtaining and processing images to obtain topographical data via phase analysis of a periodic optical pattern. As will be understood, this need not necessarily be the case. For example, techniques such as triangulation might be used instead of using phase-stepping algorithms. Further still, if phase-stepping methods are to be used, the shift in the pattern could be obtained using techniques other than that described above. For instance, they could be obtained by changing the pattern projected by the projector, or by moving the object.

The description of the specific embodiment also involves obtaining and processing images to obtain photogrammetrical target points by identifying discontinuities in the pattern projected onto the object. As will be understood, this need not necessarily be the case. For example, target points can be identified using other known methods. For instance, target points can be identified by markers placed on the object or by projecting a marker onto the object.

Furthermore, the description describes using the same images for identifying target features as well as for obtaining topographical data. However, this need not necessarily be the case as, for instance, separate images could be obtained for use in the different processes. In this case, if target features are identified using markers stuck on or projected onto the object then it would not be necessary to project a pattern during the obtaining of images for use in identifying target features.

Further still, although the invention is described as a single probe containing a projector and imaging device, the projector and image sensor could be provided separately (e.g. so that they can be physically manipulated independently of each other). Furthermore, the probe could comprise a plurality of imaging devices.

The invention claimed is:

1. A non-contact measurement apparatus, comprising:

a probe configured to be mounted on a coordinate positioning apparatus, comprising an imaging device for capturing an image of an object to be measured;

a processor configured to:

a) analyse at least one first image of an object obtained by the imaging device from a first perspective and at least one second image of the object obtained by the imaging device, which is the same imaging device used to obtain the at least one first image of the object, from a second perspective so as to identify in each of the at least one first image and the at least one second image of the object at least one common photogrammetric target feature on the object to be measured, determine the two-dimensional coordinates of the at least one common photogrammetric target feature on the object within each image, and then, based on knowledge of the relative location and orientation of the imaging device that took the images, determine the three dimensional coordinates of the at least one common photogrammetric target feature; and b) obtain topographical data regarding a form of a surface of the object via analysis of the distortion of a structured light pattern projected on the object caused by height variation on the surface of the object as imaged in at least one image, obtained by the imaging device, which is the same imaging device used to obtain the at least one first image and the at least one second image of the object, wherein the non-contact measurement apparatus being further configured to use both the data obtained from a) and b) to provide a 3D point cloud that describes the shape of the object.

2. A non-contact measurement apparatus as claimed in claim 1, in which the probe comprises at least one projector for projecting an optical pattern onto the surface of the object to be measured.

3. A non-contact measurement apparatus as claimed in claim 1, in which the processor is configured to obtain the topographical data regarding the surface of the object via analysis of at least one of the at least one first image and the at least one second image.

4. A non-contact measurement apparatus as claimed in claim 1, in which the processor is configured to process a set of images in which the position of an optical pattern on the object is different for each image in the set in order to determine the topographical data.

5. A non-contact measurement apparatus as claimed in claim 1, in which the processor is configured to identify an irregularity in an optical pattern projected on the object in each of the first and second images as the at least one *common photogrammetric* target feature.

6. A non-contact measurement apparatus as claimed in claim 5, in which the processor is configured to process:

a set of first images obtained by the imaging device from the first perspective, the position of an optical pattern projected onto the object being different for each image in the set; and a set of second images obtained by the imaging device from the second perspective, the position of an optical pattern projected onto the object being different for each image in the set, in order to identify *the* at least one *common photogrammetric* target feature on the object to be measured and to determine the position of the *common photogrammetric* target feature on the object relative to [the] *an* image sensor *of the imaging device*.

7. A non-contact measurement apparatus as claimed in claim 6, in which the processor is configured to process at least one of the first or second sets of images in order to determine the topographical data.

8. A non-contact measurement apparatus as claimed in claim 7, in which the processor is configured to calculate at least one of a first phase map from the set of first images and a second phase map from the set of second images.

9. A non-contact measurement apparatus as claimed in claim 8, in which the processor is configured to determine the topographical data from at least one of the at least one first phase map and second phase map.

10. A non-contact measurement apparatus as claimed in claim 2, in which the projector has a fixed optical pattern.

11. A device for use in a non-contact measurement apparatus that includes a probe that is configured to be mounted on a coordinate positioning apparatus, having an imaging device for capturing an image of an object to be measured, the device comprising:

a processor configured to:

a) analyse at least one first image of an object obtained by the imaging device from a first perspective and at least one second image of the object obtained by the imaging device, which is the same imaging device used to obtain the at least one first image of the object, from a second perspective so as to identify in each of the at least one first image and the at least one second image of the object at least one common photogrammetric target feature on the object to be measured, determine the two-dimensional coordinates of the at least one common photogrammetric target feature on the object within each image, and then, based on knowledge of the relative location and orientation of the imaging device that took the images, determine the three dimensional coordinates of the at least one common photogrammetric target feature; and b) obtain topographical data regarding a form of a surface of the object via analysis of the distortion of a structured light pattern projected on the object caused by height variation on the surface of the object as imaged in at least one image, obtained by the imaging device, which is the same imaging device used to obtain the at least one first image and the at least one second image of the object, wherein the device being further configured to use both the data obtained from a) and b) to provide a 3D point cloud that describes the shape of the object.

12. A non-contact method for measuring an object located within a measurement space using a probe comprising an imaging device, the method comprising:

a) analysing at least one first image of an object obtained by the imaging device from a first perspective and at least one second image of the object obtained by the imaging device, which is the same imaging device used to obtain the at least one first image of the object, from a second perspective so as to identify in each of the at least one first image and the at least one second image of the object at least one common photogrammetric target feature on the object to be measured, determining the two-dimensional coordinates of the at least one common photogrammetric target feature on the object within each image, and then, based on knowledge of the relative location and orientation of the imaging device that took the images, determining the three dimensional coordinates of the at least one common photogrammetric target feature; and b) obtaining topographical data regarding a form of a surface of the object via analysis of the distortion of a structured light pattern projected on the object caused by height variation on the surface of the object as imaged in at least one image, obtained by the imaging device, which is the same imaging device used to obtain the at least one first image and the at least one second image of the object, wherein both the data obtained from a) and b) is used to provide a 3D point cloud that describes the shape of the object.

13. A method as claimed in claim 12, in which at least one of the at least one first image of the object from the first perspective and at least one second image of the object from the second perspective comprises the at least one image of the object on which an optical pattern is projected.

14. A method as claimed in claim 12 in which the method comprises relatively moving the object and the imaging device between the first and second perspectives.

15. A method as claimed in claim 12 in which the probe comprises a projector for projecting an optical pattern.

16. A memory and a processor, the memory storing instructions which, when executed by the processor, cause the processor to control the probe comprising the imaging device in accordance with the method of claim 12.

17. A non-transitory computer readable medium storing instructions, which when executed, perform the method of claim 12.

*18. A non-contact measurement apparatus as claimed in claim 1, in which the coordinate positioning apparatus is a coordinate measuring machine.*

*19. A non-contact measurement apparatus as claimed in claim 1, in which the coordinate positioning apparatus is a machine tool.*

*20. A non-contact measurement apparatus as claimed in claim 1, in which the probe is mounted on an articulated probe head comprising at least one rotational axis.*

*21. A non-contact measurement apparatus as claimed in claim 20, in which the articulated probe head comprises at least two rotational axes.*

*22. A non-contact measurement apparatus as claimed in claim 20, in which the coordinate positioning apparatus comprises a base for the object, a frame on which a quill is mounted which can be moved along three mutually orthogonal axes and on which the articulated probe head is mounted.*

*23. A method as claimed in claim 12, in which the obtaining topographical data step comprises analysis of at least one of the at least one first image and the at least one second image.*

*24. A method as claimed in claim 12, in which the method comprises processing a set of images in which the position of an optical pattern on the object is different for each image in the set in order to determine the topographical data.*

*25. A method as claimed in claim 12, in which the method comprises identifying an irregularity in an optical pattern projected on the object in each of the first and second images as the at least one common photogrammetric target feature.*

*26. A method as claimed in claim 25, in which the method comprises:*

*processing a set of first images obtained by the imaging device from the first perspective, the position of an optical pattern projected onto the object being different for each image in the set; and*

*processing a set of second images obtained by the imaging device from the second perspective, the position of an optical pattern projected onto the object being different for each image in the set,*

*in order to identify the at least one common photogrammetric target feature on the object to be measured and to determine the position of the common photogrammetric target feature on the object relative to an image sensor of the imaging device.*

*27. A method as claimed in claim 26, in which the method comprises processing at least one of the first or second sets of images in order to determine the topographical data.*

*28. A method as claimed in claim 27, in which the method comprises calculating at least one of a first phase map from the set of first images and a second phase map from the set of second images.*

*29. A method as claimed in claim 28, in which the method comprises determining the topographical data from at least one of the at least one first phase map and second phase map.*

*30. A method as claimed in claim 15, in which the projector has a fixed optical pattern.*

*31. A method as claimed in claim 12, in which the probe is mounted on a coordinate positioning apparatus.*

*32. A method as claimed in claim 31, in which the coordinate positioning apparatus is a coordinate measuring machine.*

*33. A method as claimed in claim 31, in which the coordinate positioning apparatus is a machine tool.*

*34. A method as claimed in claim 31, in which the coordinate positioning apparatus comprises a base for the object, a frame on which a quill is mounted which can be moved along three mutually orthogonal axes and on which an articulated probe head is mounted.*

*35. A method as claimed in claim 12, in which the probe is mounted on an articulated probe head comprising at least one rotational axis.*

*36. A method as claimed in claim 35, in which the articulated probe head comprises at least two rotational axes.*

* * * * *